(12) United States Patent  
Tohara et al.

(10) Patent No.: US 9,019,172 B2  
(45) Date of Patent: Apr. 28, 2015

(54) IMAGE DISPLAY APPARATUS

(75) Inventors: Masakazu Tohara, Kawasaki (JP);
Shoichi Yamazaki, Yokohama (JP);
Kazutaka Inoguchi, Kawasaki (JP);
Kenichi Saito, Yokohama (JP); **Motomi
Tsuyuki**, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1398 days.

(21) Appl. No.: 12/609,334

(22) Filed: Oct. 30, 2009

(65) Prior Publication Data

US 2010/0109980 A1 May 6, 2010

(30) Foreign Application Priority Data

Oct. 31, 2008 (JP) ................ 2008-281776

(51) Int. Cl.
*G09G 5/00* (2006.01)
*G03H 1/00* (2006.01)
*G02B 21/22* (2006.01)
*G02B 27/22* (2006.01)
*G02B 27/01* (2006.01)

(52) U.S. Cl.
CPC .... *G02B 27/0172* (2013.01); *G02B 2027/0123* (2013.01); *G02B 2027/0132* (2013.01)

(58) Field of Classification Search
CPC ........ G02B 27/04; G02B 27/14; G02B 27/22; G02B 27/26; G02B 25/00; G02B 5/04; G02B 21/00; G09G 5/00; G09G 3/00; G03B 21/28; G03B 21/26; G02F 1/01
USPC ............ 345/7–9, 32, 697; 359/630–639
See application file for complete search history.

(56) References Cited

U.S. PATENT DOCUMENTS

| 5,504,763 | A | * | 4/1996 | Bischel et al. ................ 372/33 |
| 5,982,343 | A |   | 11/1999 | Iba et al. |
| 6,008,778 | A | * | 12/1999 | Takahashi et al. ............ 345/7 |
| 2002/0075449 | A1 | * | 6/2002 | Strahle ..................... 351/205 |
| 2003/0122732 | A1 | * | 7/2003 | Shaw ........................ 345/7 |

(Continued)

FOREIGN PATENT DOCUMENTS

| JP | 7-274097 A | 10/1995 |
| JP | 10-246865 A | 9/1998 |

(Continued)

*Primary Examiner* — Andrew Sasinowski
*Assistant Examiner* — Nguyen H Truong
(74) *Attorney, Agent, or Firm* — Rossi, Kimms & McDowell LLP

(57) ABSTRACT

The image display apparatus includes an observation optical system including first and second optical elements which respectively introducing first and second light fluxes from first and second image-forming elements to first and second exit pupils, and a relay optical system. The relay optical system causes third and fourth light fluxes from the second and first image-forming elements to form intermediate images and introducing them to the first and second optical elements. The observation optical system displays images corresponding to the first and second original images in mutually different viewing angle areas by introducing the first and third light fluxes to the first exit pupil through the first optical element, and displays images corresponding to the second and first original images in mutually different viewing angle areas by introducing the second and fourth light fluxes to the second exit pupil through the second optical element.

5 Claims, 10 Drawing Sheets

(56) References Cited

U.S. PATENT DOCUMENTS

2007/0018124 A1* 1/2007 Nishi .................. 250/559.36
2009/0027772 A1* 1/2009 Robinson .................. 359/472

FOREIGN PATENT DOCUMENTS

JP     11-326820 A     11/1999
JP     3524569 B2     5/2004

* cited by examiner

US 9,019,172 B2

IMAGE DISPLAY APPARATUS

BACKGROUND OF THE INVENTION

The present invention relates to an image display apparatus which allows observation of one combined image of plural images formed by light fluxes from plural image-forming elements from an exit pupil position, and more particularly to an image display apparatus suitable for a head mounted display (HMD) or the like.

The image display apparatus such as an HMD is required to be capable of displaying a high quality image with a wide viewing angle. In order to increase the viewing angle, a large LCD panel or the like is preferably used as an image-forming element which forms an original image. In many cases, however, it is difficult to obtain an image-forming element compliant with necessary viewing angle specifications.

Under such circumstances, Japanese Patent Laid-Open No. 07-274097, Japanese Patent No. 3524569, and Japanese Patent Laid-Open Nos. 11-326820 and 10-246865 disclose image display apparatuses each of which uses plural compact image-forming elements, forms images in mutually different viewing angle areas with light fluxes from the image-forming elements, and allows observation of a combined image formed by joining the images to each other.

Each of the image display apparatuses disclosed in Japanese Patent Laid-Open No. 07-274097 and Japanese Patent No. 3524569 includes an optical system in which a V-shaped mirror is disposed symmetrically with respect to a visual axis of an observer. In this image display apparatus, a light flux from an original image formed by a first image-forming element is reflected by one reflection surface of the V-shaped mirror to be introduced to an exit pupil while a light flux from an original image formed by a second image-forming element is reflected by another reflection surface of the V-shaped mirror to be introduced to the exit pupil.

The image display apparatus disclosed in Japanese Patent Laid-Open No. 11-326820 uses a prism having a shape symmetrical with respect to a visual axis. In this image display apparatus, a light flux from an original image formed by a first image-forming element is introduced to the prism to enter thereinto through a first surface thereof facing the first image-forming element, is reflected by second and third surfaces of the prism which are internal total reflection surfaces also serving as transmission surfaces, and is then transmitted through the second surface to be introduced to an exit pupil.

Further, a light flux from an original image formed by a second image-forming element is introduced to the prism to enter thereinto through a fourth surface thereof facing the second image-forming element, is reflected by fifth and sixth surfaces of the prism which are internal total reflection surfaces also serving as transmission surfaces, and is then transmitted through the fifth surface to be introduced to the exit pupil.

The image display apparatus disclosed in Japanese Patent Laid-Open No. 10-246865 also uses a prism having a shape symmetrical with respect to a visual axis. In this image display apparatus, light fluxes from original images formed by first and second image-forming elements enter the prism through first and second surfaces thereof respectively facing the first and second image-forming elements. The first and second surfaces are also used as reflection surfaces for reflecting the light fluxes entering the prism through the first and second surfaces to introduce them to an exit pupil.

However, in all the image display apparatuses disclosed in Japanese Patent Laid-Open No. 07-274097, Japanese Patent No. 3524569, and Japanese Patent Laid-Open Nos. 11-326820 and 10-246865, the two image-forming elements are used for one exit pupil, that is, one eye of an observer. As a result, in the image display apparatus such as an HMD generally used for both eyes, four image-forming elements are necessary, which causes not only complication and enlargement of the apparatus but also a cost increase.

SUMMARY OF THE INVENTION

The present invention provides an image display apparatus capable of both eye observation of a wide viewing angle combined image formed by joining plural images formed in mutually different viewing angle areas with image-forming elements whose number is as small as possible.

The present invention provides as one aspect thereof an image display apparatus that includes a first image-forming element configured to form a first original image, a second image-forming element configured to form a second original image, and an observation optical system. The observation optical system includes a first optical element introducing a first light flux of a light flux from the first image-forming element to a first exit pupil, a second optical element introducing a second light flux of a light flux from the second image-forming element to a second exit pupil, and a relay optical system causing a third light flux of the light flux from the second image-forming element to form an intermediate image and introducing the third light flux to the first optical element, and causing a fourth light flux of the light flux from the first image-forming element to form an intermediate image and introducing the fourth light flux to the second optical element. The observation optical system displays images corresponding to the first and second original images in mutually different viewing angle areas of an observation viewing angle from the first exit pupil by introducing the first and third light fluxes to the first exit pupil through the first optical element, and displays images corresponding to the second and first original images in mutually different viewing angle areas of an observation viewing angle from the second exit pupil by introducing the second and fourth light fluxes to the second exit pupil through the second optical element.

The present invention provides as another aspect thereof an image display apparatus that includes a first image-forming element configured to form a first original image, a second image-forming element configured to form a second original image, a third image-forming element configured to form a third original image and a fourth original image, and an observation optical system configured to include a first optical element introducing a first light flux of a light flux from the first image-forming element to a first exit pupil, a second optical element introducing a second light flux of a light flux from the second image-forming element to a second exit pupil, and a relay optical system causing a third light flux of a light flux from the third image-forming element to form an intermediate image and introducing the third light flux to the first optical element, and causing a fourth light flux of the light flux from the third image-forming element to form an intermediate image and introducing the fourth light flux to the second optical element. The observation optical system displays images corresponding to the first and third original images in mutually different viewing angle areas of an observation viewing angle from the first exit pupil by introducing the first and third light fluxes to the first exit pupil through the first optical element, and displays images corresponding to the second and fourth original images in mutually different viewing angle areas of an observation viewing angle from the second exit pupil by introducing the second and fourth light fluxes to the second exit pupil through the second optical element.

The present invention provides as still another aspect thereof an image display apparatus that includes a first image-forming element configured to form a first original image, a second image-forming element configured to form a second original image, and an observation optical system configured to include a first optical system causing a first light flux from the first image-forming element to form an intermediate image and introducing the first light flux to an exit pupil, and introducing a second light flux from the second image-forming element to the exit pupil through an optical element included in the first optical system. The observation optical system displays an image corresponding to the first original image and an image corresponding to the second original image respectively in a first viewing angle area and a second viewing angle area of an observation viewing angle from the exit pupil by introducing the first light flux and the second light flux to the exit pupil. The first viewing angle area is wider than the second viewing angle area.

Other aspects of the present invention will become apparent from the following description and the attached drawings.

DESCRIPTION OF EMBODIMENTS

Exemplary embodiments of the present invention will be described hereinafter with reference to the accompanying drawings.

Embodiment 1

Figure 1:
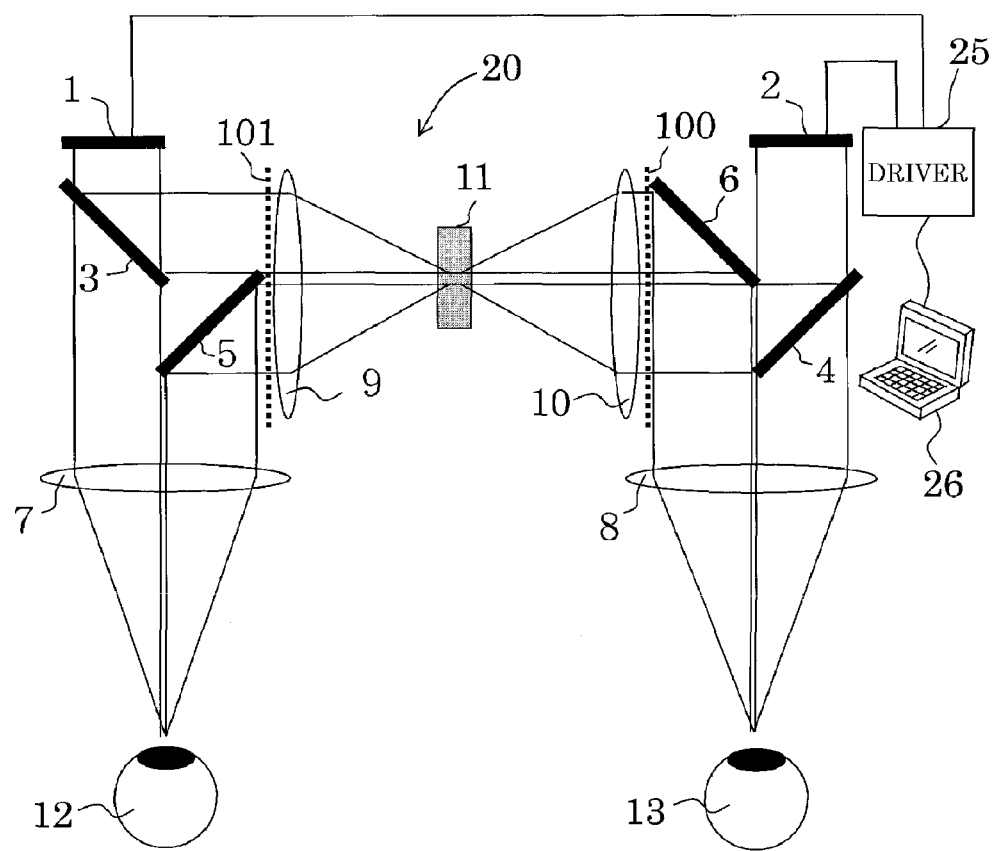
FIG. 1 shows a configuration of an HMD that is Embodiment 1 of the present invention.

FIG. 1 shows a configuration of an HMD as an image display apparatus which is a first embodiment (Embodiment 1) of the present invention. In FIG. 1, reference numeral 1 denotes a first image-forming element, and reference numeral 2 denotes a second image-forming element. Each of the image-forming elements 1 and 2 is an element such as an LCD panel or an organic EL element for forming an original image.

Reference numeral 3 denotes a first beam splitter (first light splitter), and reference numeral denotes a second beam splitter (second light splitter).

Reference numeral 5 denotes a first reflection mirror, and reference numeral 6 denotes a second reflection mirror. Reference numeral 7 denotes a first ocular lens, and reference numeral 8 denotes a second ocular lens. Reference numeral 9 denotes a first relay lens, and reference numeral 10 denotes a second relay lens. Reference numeral 11 denotes a prism (image reversing member) which has a function (image reversing function) of reversing an optical image vertically and horizontally. The first and second ocular lenses 7 and 8 respectively correspond to first and second optical elements. The first and second reflection mirrors 5 and 6, the first and second relay lenses 9 and 10 and the prism 11 constitute a relay optical system 20. The first and second ocular lenses 7 and 8 and the relay optical system 20 constitute an observation optical system.

Reference numeral 12 denotes a first exit pupil, and reference numeral 13 denotes a second exit pupil. Left and right eyes of an observer are respectively placed at positions of the first and second exit pupils 12 and 13. Reference numeral 100 denotes a first intermediate image (first intermediate image-forming surface), and reference numeral 101 denotes a second intermediate image (second intermediate image-forming surface).

Figure 15:
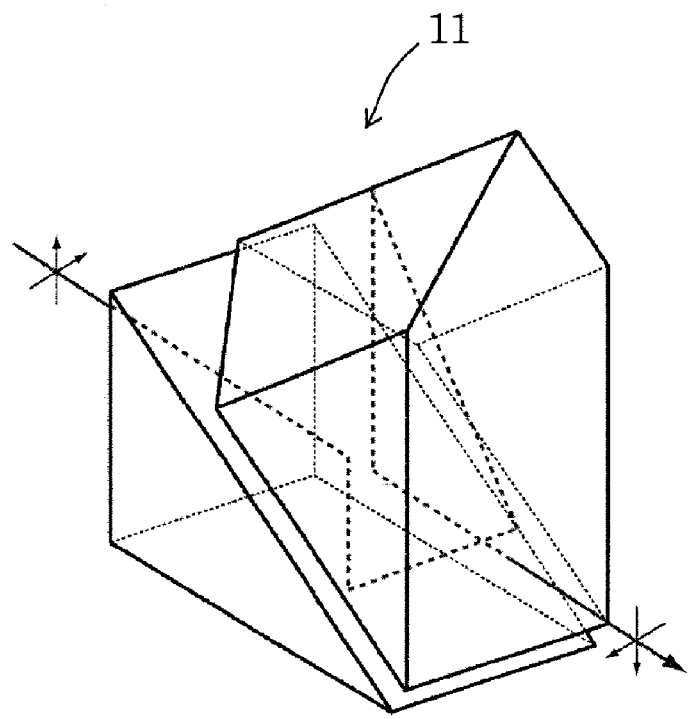
FIG. 15 is a perspective view showing a Schmidt (Pechan-Dach) prism.
Figure 16:
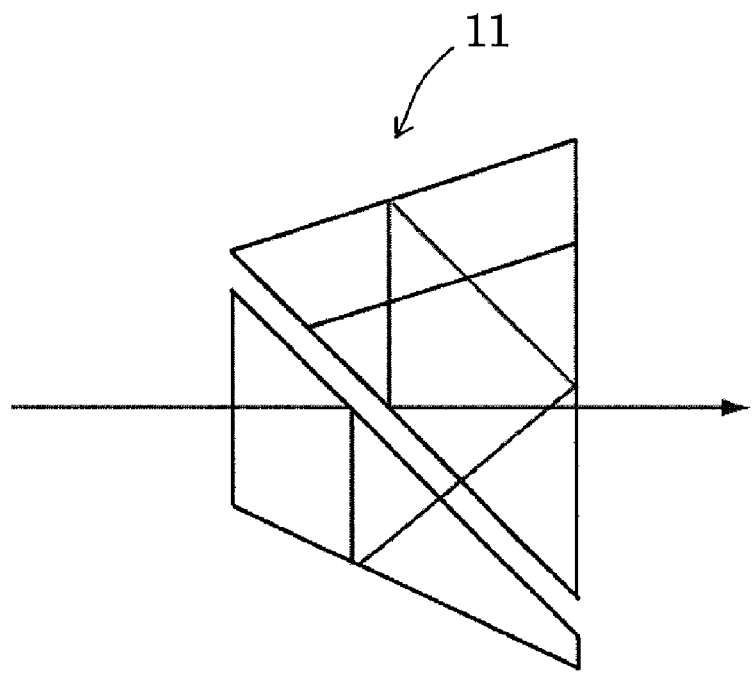
FIG. 16 is a sectional view of the Schmidt prism.

As the prism 11 which has the image reversing function, a Schmidt (Pechan-Dach) prism in which an entrance optical axis and an exit optical axis are not shifted to each other is preferably used. FIGS. 15 and 16 show an appearance and a side section of the Schmidt prism. As shown in FIG. 16, the Schmidt prism is formed such that the entrance optical axis and the exit optical axis extend coaxially.

Figure 17:
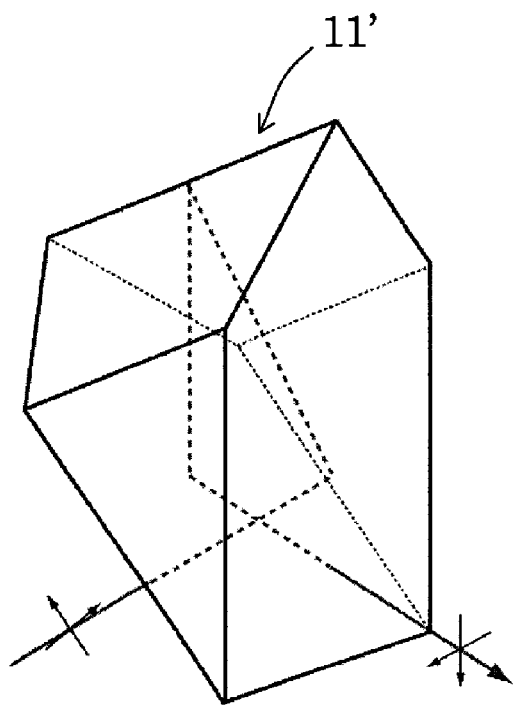
FIG. 17 is a perspective view showing a prism in which two reflection functions are added to a Dach prism.
Figure 18:
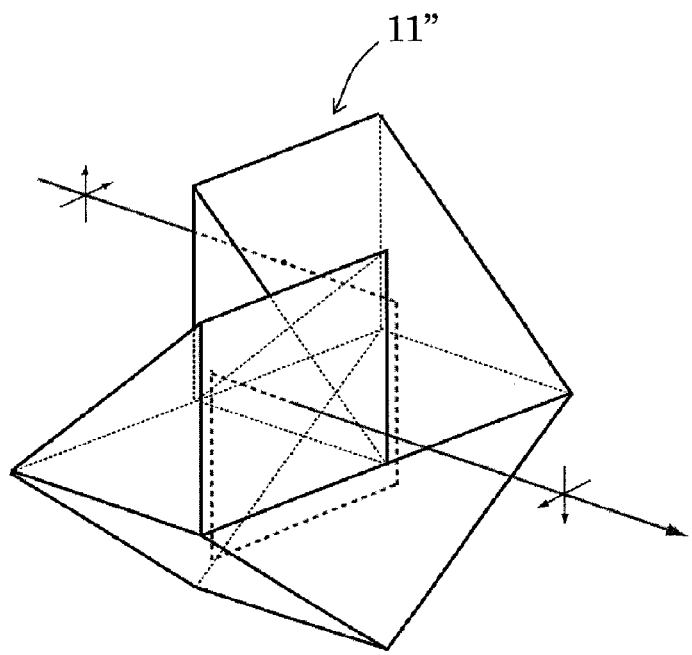
FIG. 18 is a perspective view of a Porro prism.

As the prism 11 which has the image reversing function, a prism 11' having two reflection functions added to a Dach prism shown in FIG. 17 or a Porro prism 11" shown in FIG. 18 may be used. The prism shown in FIG. 17 is one of two prism portions constituting the Schmidt prism, in which the entrance optical axis and the exit optical axis are tilted about 45° to each other. The Porro prism shown in FIG. 18 is formed such that an entrance optical axis and an exit optical axis are shifted vertically or horizontally.

Taking a shift of the entrance optical axis and the exit optical axis into consideration beforehand enables use of these prisms. In Numerical Example 3 described below corresponding to this embodiment, the prism having two reflection functions added to the Dach prism shown in FIG. 17 is used as the prism 11.

A driver 25 is connected to the first and second image-forming elements 1 and 2. Image information (input image) is input to the driver 25 from an image supply apparatus 26 such as a personal computer, a DVD player or a television tuner. The driver 25 causes the first image-forming element 1 to form an original image (hereinafter referred to as "first original image") corresponding to a left half image area of the input image, and causes the second image-forming element 2 to form an original image (hereinafter referred to as "second original image") corresponding to a right half image area of the input image.

The arrangement that the driver 25 causes each image-forming element to form the original image based on the input image from the image supply apparatus 26 is similarly applied to other embodiments described below.

A part (first light flux) of a light flux from the first original image formed by the first image-forming element 1 is transmitted through the first beam splitter 3, while another part (fourth light flux) is reflected by the first beam splitter 3. The light flux transmitted through the first beam splitter 3 is transmitted through the first ocular lens 7 to be introduced to the first exit pupil 12. The introduced light flux forms an enlarged virtual image (hereinafter referred to as "first split image") corresponding to the first original image in a left half viewing angle area (left viewing field) of an observation viewing angle (entire left viewing field) from the first exit pupil 12.

The light flux reflected by the first beam splitter 3 is transmitted through the first relay lens 9 to be subjected to the vertical and horizontal image reversing function by the prism 11, and is then transmitted through the second relay lens 10 to reach the second reflection mirror 6. This light flux forms a first intermediate image 100 near the second relay lens 10 (at a position between the second relay lens 10 and the second ocular lens 8). In other words, the light flux forms an intermediate image once (odd number of times), and is then introduced to the second exit pupil 13 as described below.

The light flux reaching the second reflection mirror 6 and reflected thereby is transmitted through the second ocular lens 8 to be introduced to the second exit pupil 13. The introduced light flux forms a first split image corresponding to the first original image in a left half viewing angle area (left viewing field) of an observation viewing angle (entire right viewing field) from the second exit pupil 13.

A part (second light flux) of a light flux from the second original image formed by the second image-forming element 2 is transmitted through the second beam splitter 4, while another part (third light flux) is reflected by the second beam splitter 4. The light flux transmitted through the second beam splitter 4 is transmitted through the second ocular lens 8 to be introduced to the second exit pupil 13. The introduced light flux forms an enlarged virtual image (hereinafter referred to as "second split image") corresponding to the second original image in a right half viewing angle area (right viewing field) of the observation viewing angle (entire right viewing field) from the second exit pupil 13.

The light flux reflected by the second beam splitter 4 is transmitted through the second relay lens 10 to be subjected to the vertical and horizontal image reversing function by the prism 11, and is then transmitted through the first relay lens 9 to reach the first reflection mirror 5. This light flux forms a second intermediate image 101 near the first relay lens 9 (at a position between the first relay lens 9 and the first ocular lens 7). In other words, the light flux forms an intermediate image once (odd number of times), and is then introduced to the first exit pupil 12 as described below.

The light flux reaching the first reflection mirror 5 and reflected thereby is transmitted through the first ocular lens 7 to be introduced to the first exit pupil 12. The introduced light flux forms a second split image corresponding to the second original image in a right half viewing angle area (right viewing field) of the observation viewing angle (entire right viewing field) from the first exit pupil 12.

As described above, this embodiment can display, for each of the left and right (first and second) exit pupils 12 and 13, a combined image formed by joining the two split images to each other which correspond to the two original images formed by the two image-forming elements 1 and 2 common to the left and right exit pupils 12 and 13. In other words, in an HMD for both eyes, a combined image with a wide viewing angle can be displayed by using two image-forming elements.

Causing the light flux from the image-forming element located away from the exit pupil to form the intermediate image enables setting of a long optical path length from the image-forming element or optional setting of a magnification of the image displayed by the light flux from the image-forming element. This achieves a high freedom of designing. As a result, the image can be easily displayed to the left and right eyes by using the two image-forming elements. The same is applied to the other embodiments 2 to 6 described below.

In this embodiment, it is desirable that the light fluxes from the first and second image-forming elements 1 and 2 be introduced uniformly to the both eyes (exit pupils 12 and 13). Therefore, it is preferable that the first and second beam splitters 3 and 4 be half mirrors in which an amount of light transmitted therethrough and an amount of light reflected thereby are equal to each other.

The case where the relay lenses 9 and 10 are used has been described referring to FIG. 1. However, in place of the relay lenses 9 and 10, optical elements having a prism shape which includes plural reflection surfaces or a surface having an optical power may be used.

Embodiment 2

Figure 2:
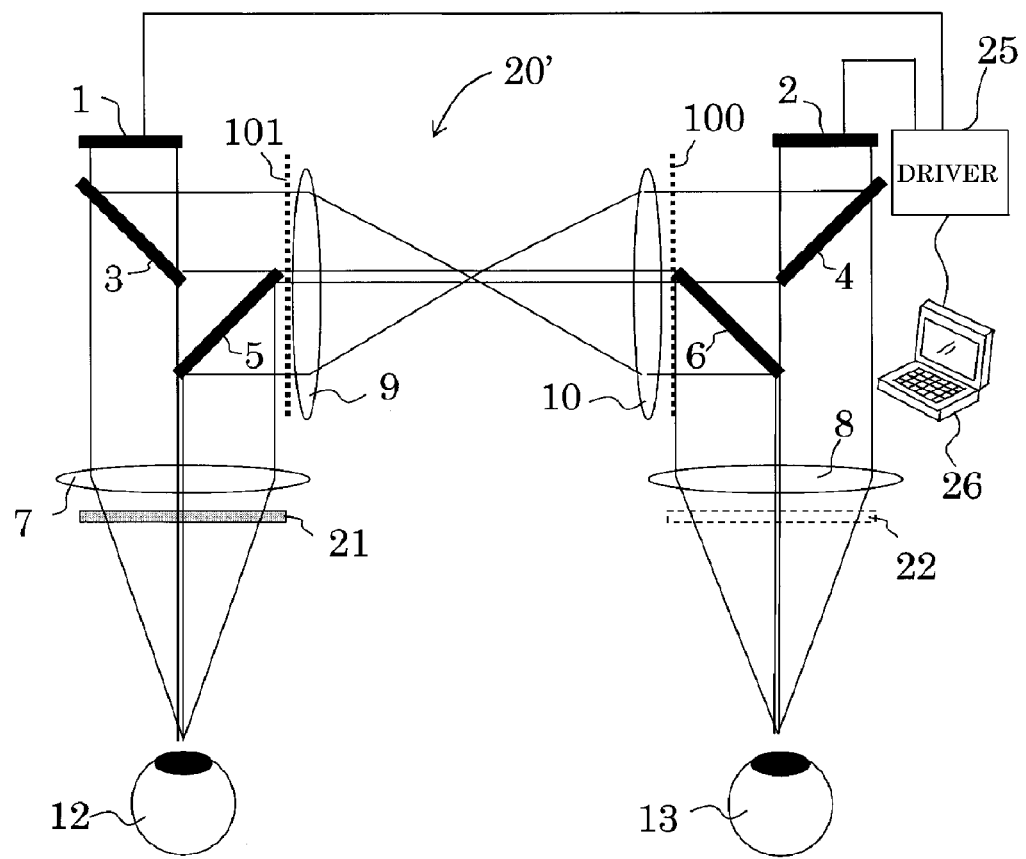
FIG. 2 shows a configuration of an HMD that is Embodiment 2 of the present invention.

FIG. 2 shows a configuration of an HMD as an image display apparatus which is a second embodiment (Embodiment 2) of the present invention. In FIG. 2, components common to those in Embodiment 1 are denoted by the same reference numerals as those in Embodiment 1.

In this embodiment, in place of the prism 11 described in Embodiment 1, a time-division shutter which is a switching member is used. In FIG. 2, reference numeral 21 denotes a first time-division shutter disposed between a first ocular lens 7 and a first exit pupil 12, and reference numeral 22 denotes a second time-division shutter disposed between a second ocular lens 8 and a second exit pupil 13.

Optical paths of light fluxes from first and second image-forming elements 1 and 2 are the same as those of Embodiment 1 except that the light fluxes are not subjected to the image reversing function of the prism 11. Also as in Embodiment 1, the light fluxes from the first and second image-forming elements 1 and 2 form intermediate images 100 and 101 near first and second relay lenses 9 and 10.

The first and second ocular lenses 7 and 8 respectively correspond to first and second optical elements, and first and second reflection mirrors 5 and the first and second relay lenses 9 and 10 constitute a relay optical system 20'. Further, the first and second ocular lenses 7 and 8 and the relay optical system 20' constitute an observation optical system.

In this embodiment, the first and second time-division shutters 21 and 22 are alternately switched between an opened state and a closed state. In other words, alternate switching between a state where the light fluxes (first and third light fluxes) from the first and second image-forming elements 1 and 2 are introduced to the first exit pupil 12 and a state where the light fluxes (second and fourth light fluxes) from the first and second image-forming elements 1 and 2 are introduced to the second exit pupil 13 is performed.

An input image for a right eye and an input image for a left eye are input to a driver 25 from an image supply apparatus 26. The driver 25 causes the first image-forming element 1 to alternately form a first original image for the right eye and a first original image for the left eye, the first original images respectively corresponding to left half image areas of the input images for the right and left eyes. The driver 25 also causes the second image-forming element 2 to alternately form a second original image for the right eye and a second original image for the left eye, the second original images respectively corresponding to right half image areas of the input images for the right and left eyes.

Further, in synchronization with switching of the first and second time-division shutters 21 and 22 between the opened state and the closed state, the first and second original images formed by the first and second image-forming elements 1 and 2 are switched between the original image for the left eye and the original image for the right eye. When the image-forming elements 1 and 2 form the first and second original images for the left eye, the first time-division shutter 21 is opened while the second time-division shutter 22 is closed. On the other hand, when the image-forming elements 1 and 2 form the first and second original images for the right eye, the second time-division shutter 22 is opened while the first time-division shutter 21 is closed.

Thus, a combined image for the right eye formed by joining first and second split images respectively corresponding to the first and second original images for the right eye is displayed for the right eye. A combined image for the left eye formed by joining first and second split images respectively corresponding to the first and second original images for the left eye is displayed for the left eye.

As described above, this embodiment can display, for each of the left and right (first and second) exit pupils 12 and 13, a combined image formed by joining the two split images to each other which correspond to the two original images formed by the two image-forming elements 1 and 2 common to the left and right exit pupils 12 and 13 in a time-division manner. In other words, in an HMD for both eyes, a combined image with a wide viewing angle can be displayed by using two image-forming elements.

In this embodiment, a prism having an image reversing function is not provided in an intermediate image-forming optical path, and hence split images displayed for the first and second exit pupils 12 and 13 by a light flux from one image-forming element are not identical, that is, one of the split images is reversed vertically and horizontally with respect to the other split image. In this embodiment, therefore, the first and second time-division shutters 21 and 22 are respectively disposed between the first and second ocular lenses 7 and 8 and the first and second exit pupils 12 and 13.

In this arrangement, the split image displayed in a right half viewing angle area (hereinafter simply referred to as "right viewing angle area") for the left eye is formed after the light flux from the second image-forming element 2 forms the intermediate image 100, and hence the second image-forming element 2 is required to form a vertically and horizontally reversed second original image for the left eye beforehand. Similarly, the split image displayed in a left half viewing angle area (hereinafter simply referred to as "left viewing angle area") for the right eye is formed after the light flux from the first image-forming element 1 forms the intermediate image 101, and hence the first image-forming element 1 is required to form a vertically and horizontally reversed first original image for the right eye beforehand.

Accordingly, the first image-forming element 1 forms a normal direction first original image corresponding to the left viewing angle area for the left eye and a vertically and horizontally reversed first original image corresponding to the left viewing angle area for the right eye alternately (that is, in a time-division manner). The second image-forming element 2 forms a normal direction second original image corresponding to the right viewing angle area for the right eye and a vertically and horizontally reversed second original image corresponding to the right viewing angle area for the left eye alternately (in a time-division manner). In this case, the first and second time-division shutters 21 and 22 are opened and closed in synchronization with switching of the original images.

In the HMD of such a time-division system, the original image is preferably rewritten at a frequency of 120 Hz or more to form each of a normal direction original image and a reversed original image on each image-forming element 60 times or more per second. It is also possible that the original image is rewritten at a frequency of 60 Hz or less to form each of the normal direction original image and the reversed original image on each image-forming element 30 times or less per second. However, this case generates flicker, which provides uncomfortable feeling to the observer.

According to this embodiment, using the time-division shutters 21 and 22 also enables displaying of combined images having a parallax for the left and right eyes. Thus, a stereoscopic 3D image unrealizable by Embodiment 1 can be displayed. In this embodiment, the first and second image-forming elements 1 and 2 form original images mutually having a parallax (parallax images). Specifically, the first image-forming element 1 forms a normal direction parallax image corresponding to the left viewing angle area for the left eye and a reversed parallax image corresponding to the left viewing angle image for the right eye in a time-division manner.

The second image forming element 2 forms a normal direction parallax image corresponding to the right viewing angle area for the right eye and a reversed parallax image corresponding to the right viewing angle area for the left eye in a time-division manner.

In such an HMD which enables stereoscopic viewing, for the same reason as that described above, the parallax image is preferably rewritten at a frequency of 120 Hz or more to form each of the normal direction parallax image and the reversed parallax image on each image-forming element 60 times or more per second.

Also in this embodiment, it is desirable that the light fluxes from the first and second image-forming elements 1 and 2 be introduced uniformly to the both eyes (exit pupils 12 and 13). Therefore, it is preferable that the first and second beam splitters 3 and 4 be half mirrors in which an amount of light transmitted therethrough and an amount of light reflected thereby are equal to each other.

The case where the relay lenses 9 and 10 are used has been described referring to FIG. 2. However, in place of the relay lenses 9 and 10, optical elements having a prism shape which includes plural reflection surfaces or a surface having an optical power may be used.

Embodiment 3

Hereinafter, HMDs as image display apparatuses which are third to fifth embodiments (Embodiments 3 to 5) of the present invention will be described. First, definitions of a "meridional section", a "sagittal section", a "local meridional section" and a "local sagittal section" used in Embodiments 3 to 5 and 8 will be described.

In an optical system (coaxial optical system) that is not a decentered optical system, when a z axis is defined as an optical axis in a surface apex coordinate system of each optical surface, a y-z cross section is a conventional meridional cross section and an x-z cross section is a conventional sagittal cross section.

On the other hand, since the optical systems in Embodiments 3 to 5 are decentered optical systems, the local "meridional cross section" and the "local sagittal cross" section corresponding to the decentered optical system are newly defined.

A light ray passing through a center of the original image formed on the image-forming element and a center of the exit pupil of the optical system is defined as a "central viewing angle principal ray". A cross section including a part of the central viewing angle principal ray reaching a hit point on each optical surface and a part leaving from the hit point is defined as the "local meridional cross section". A cross section including the hit point, being orthogonal to the local meridional cross section and being parallel to the conventional sagittal cross section of the surface apex coordinate system of the each optical surface is defined as the "local sagittal cross section".

Figure 3:
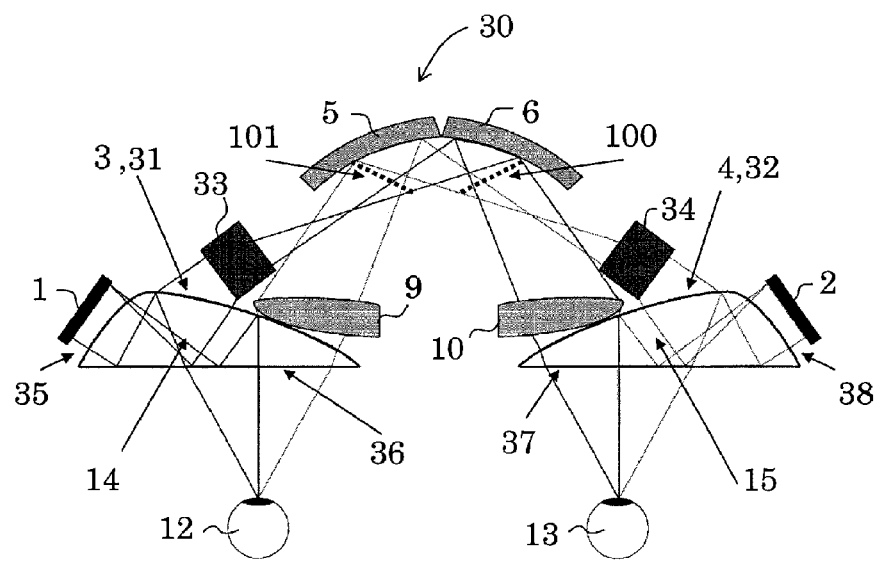
FIG. 3 shows a configuration of an HMD that is Embodiment 3 of the present invention.

FIG. 3 shows a configuration of the HMD which is Embodiment 3 of the present invention. In FIG. 3, components identical to or components having functions identical to those in Embodiment 1 are denoted by the same reference numerals as those in Embodiment 1.

In Embodiment 3 (also in Embodiments 4 and 5 described below), as shown in FIG. 3, first and second ocular prisms 14 and 15 are used each of which includes a function of folding an optical path by plural decentered reflective curved surfaces and a function as a beam splitter (light splitter).

Each of the ocular prisms 14 and 15 is formed of a transparent member filled thereinside with an optical medium such as glass or plastic having a refractive index larger than 1. A surface 31 of the first ocular prism 14 and a surface 32 of the second ocular prism 15 have a beam splitting function.

Reference numerals 33 and 34 denote first and second image reversing prisms having a vertical and horizontal image reversing function as in the case of the prism 11 in Embodiment 1.

The first and second ocular prisms 14 and 15 respectively correspond to first and second optical elements. The surfaces 31 and 32 of the first and second ocular prisms 14 and 15, the first and second image reversing prisms 33 and 34, first and second reflection mirrors 5 and 6 and first and second relay lenses 9 and 10 constitute a relay optical system 30. The first and second ocular prisms 14 and 15 and the relay optical system 30 constitute an observation optical system.

Figure 4:
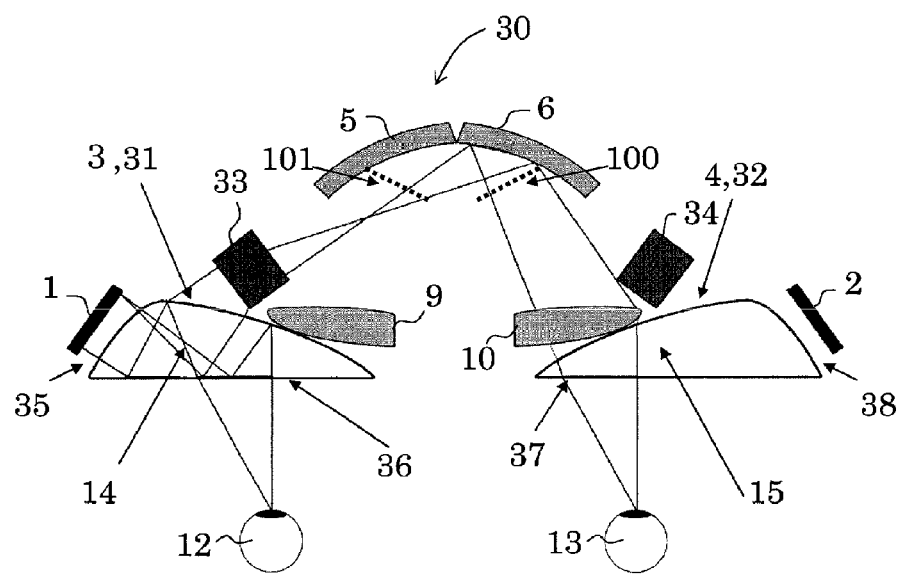
FIG. 4 shows an optical path of a light flux from one image-forming element in Embodiment 3.

FIG. 4 shows light fluxes which exit from a first image-forming element 1 and are introduced to first and second exit pupils 12 and 13 to form first split images in left viewing angle areas for left and right eyes.

In FIG. 4, the light flux from a first original image formed by the first image-forming element 1 enters the first ocular prism 14 through a surface 35 thereof, and is reflected on a surface 36 of the first ocular prism 14 to be introduced to the surface 31 having the beam splitting function. A light flux (first light flux) reflected by the surface 31 is transmitted through the surface 36 to exit from the first ocular prism 14, and is then introduced to the first exit pupil 12. The light flux introduced to the first exit pupil 12 forms the first split image in the left viewing angle area of an observation viewing angle from the first exit pupil 12.

On the other hand, a light flux (fourth light flux) transmitted through the surface 31 is reversed vertically and horizontally by the first image reversing prism 33, and then is reflected by the second reflection mirror 6 to form a first intermediate image 100 near the second reflection mirror 6 (at a position between the second reflection mirror 6 and the second relay lens 10). Then, the light flux is transmitted through the second relay lens 10 and enters the second ocular prism 15 through the surface 32 thereof. The light flux that has entered the second ocular prism 15 is transmitted through a surface 37 to exit from the second ocular prism 15 (in other words, through the second ocular prism 15) and then is introduced to the second exit pupil 13.

The light flux introduced to the second exit pupil 13 forms the first split image in the left viewing angle area of an observation viewing angle from the second exit pupil 13.

A light flux from a second original image formed by a second image-forming element 2 enters the second ocular prism 15 through a surface 38 thereof, and then is reflected by the surface 37 to be introduced to the surface 32 having the beam splitting function. A light flux (second light flux) reflected by the surface 32 is transmitted through the surface 37 to exit from the second ocular prism 15, and then is introduced to the second exit pupil 13. The light flux introduced to the second exit pupil 13 forms a second split image in a right viewing angle area of the observation viewing angle from the second exit pupil 13.

On the other hand, as shown in FIG. 3, a light flux (third light flux) transmitted through the surface 32 is reversed vertically and horizontally by the second image reversing prism 34, and then is reflected by the first reflection mirror 5 to form a second intermediate image 101 near the first reflection mirror 5 (at a position between the first reflection mirror 5 and the first relay lens 9). Then, the light flux is transmitted through the first relay lens 9 to enter the first ocular prism 14 through the surface 31 thereof, is transmitted through the surface 36 to exit from the first ocular prism 14, and then is introduced to the first exit pupil 12.

The light flux introduced to the first exit pupil 12 forms a second split image in a right viewing angle area of the observation viewing angle from the first exit pupil 12.

As described above, this embodiment can display, for each of the left and right (first and second) exit pupils 12 and 13, a combined image formed by joining the two split images to each other which correspond to the two original images formed by the two image-forming elements 1 and 2 common to the left and right exit pupils 12 and 13. In other words, in an HMD for both eyes, a combined image with a wide viewing angle can be displayed by using two image-forming elements.

In this embodiment, the light flux reaching the left viewing angle area for the left eye from the first image-forming element 1 and the light flux reaching the left viewing angle area for the right eye therefrom are reflected by or transmitted through the surfaces 31 and 32 having the beam splitting function once and twice, respectively. Therefore, if the surfaces 31 and 32 having the beam splitting function are formed as half mirrors as in the case of Embodiments 1 and 2, amounts of the light fluxes reaching the left and right viewing angle areas in the same exit pupil may be different from each other.

Thus, it is preferable that an area in the surface 31 of the first ocular prism 14 where the light flux from the first image-forming element 1 is transmitted and reflected be formed as a half mirror while an area therein where the light flux from the second image-forming element 2 is transmitted be not subjected to half mirror processing. Similarly, it is preferable that an area in the surface 32 of the second ocular prism 15 where the light flux from the second image-forming element 2 is transmitted and reflected be formed as a half mirror while an area therein where the light flux from the first image-forming element 1 is transmitted be not subjected to half mirror processing.

Such a configuration in which a partial area of a surface having a beam splitting function is formed as an area having transmitting and reflecting functions and another partial area thereof is formed as an area having only a transmitting function can prevent increase of a difference in light amount between the light fluxes reaching the left and right viewing angle areas in the same exit pupil.

It is desirable that the reflection by the surface 36 of the first ocular prism 14 and the reflection by the surface 37 of the second ocular prism 15 be internal total reflection. This enables reflection without any loss of light amount, which can display a bright image.

Forming all surfaces constituting the first and second ocular prisms 14 and 15 as curved surfaces which contribute to light collection, light divergence or aberration correction can decrease unnecessary surfaces in the optical system to achieve a cost reduction.

More preferably, forming all surfaces constituting the first and second ocular prisms 14 and 15 as non-rotationally symmetric surfaces increases a degree of freedom for correcting decentration aberration, which makes it possible to display a good quality image. In this case, it is preferable to cause each non-rotationally symmetric surface to have a surface-symmetric shape in a direction of the local sagittal cross section where the local meridional cross section is a unique plane of symmetry. This is because processing of such a surface and manufacturing of the ocular prism can be facilitated more as compared with a case where the surface has no symmetry.

The case where the relay lenses 9 and 10 are used has been described referring to FIG. 3. However, in place of the relay lenses 9 and 10, optical elements having a prism shape which includes plural reflection surfaces or a surface having an optical power may be used. The same is applied to Embodiment 4 described below.

Embodiment 4

Figure 5:
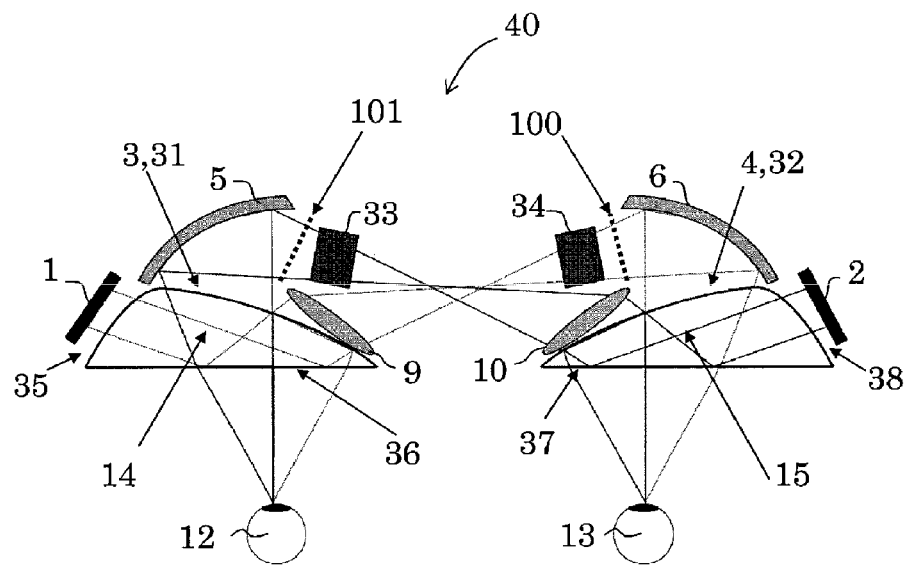
FIG. 5 shows a configuration of an HMD that is Embodiment 4 of the present invention.

FIG. 5 shows a configuration of the HMD of Embodiment 4. In FIG. 5, components identical to or components having functions identical to those in Embodiment 3 are denoted by the same reference numerals as those in Embodiment 3.

As in Embodiment 3, this embodiment folds optical paths by using plural decentered reflective curved surfaces, and uses first and second ocular prisms 14 and 15 having a beam splitting function. In this embodiment, however, viewing angle areas for introducing light fluxes from first and second image-forming elements 1 and 2 to first and second exit pupils 12 and 13 are reversed horizontally from those of Embodiment 3. In other words, the light flux from the first image-forming element 1 is introduced to right viewing angle areas of the first and second exit pupils 12 and 13, while the light flux from the second image-forming element 2 is introduced to left viewing angle areas of the first and second exit pupils 12 and 13.

The first and second ocular prisms 14 and 15 respectively correspond to first and second optical elements. Surfaces 31 and 32 of the first and second ocular prisms 14 and 15, first and second image reversing prisms 33 and 34, first and second reflection mirrors 5 and 6 and first and second relay lenses 9 and 10 constitute a relay optical system 40. Further, the first and second ocular prisms 14 and 15 and the relay optical system 40 constitute an observation optical system.

In FIG. 5, the light flux from a first original image formed by the first image-forming element 1 enters the first ocular prism 14 through a surface 35 thereof, and is reflected by a surface 36 of the first ocular prism 14 to be introduced to the surface 31 having the beam splitting function. A light flux (first light flux) reflected by the surface 31 is transmitted through the surface 36 to exit from the first ocular prism 14, and then is introduced to the first exit pupil 12. The light flux introduced to the first exit pupil 12 forms a first split image in the right viewing angle area of an observation viewing angle from the first exit pupil 12.

On the other hand, a light flux (fourth light flux) transmitted through the surface 31 is transmitted through the first relay lens 9, and then is reversed vertically and horizontally by the second image reversing prism 34 to form an intermediate image 100 near the second reflection mirror 6 (at a position between the second image reversing prism 34 and the second reflection mirror 6). Then, the light flux is reflected by the second reflection mirror 6 to enter the second ocular prism 15 through the surface 32 thereof. The light flux that has entered the second ocular prism 15 is transmitted through a surface 37 to exit from the second ocular prism 15, and then is introduced to the second exit pupil 13.

The light flux introduced to the second exit pupil 13 forms a first split image in the right viewing angle area of an observation viewing angle from the second exit pupil 13.

The light flux from a second original image formed by the second image-forming element 2 enters the second ocular prism 15 through a surface 38 thereof, and then is reflected by the surface 37 to be introduced to the surface 32 having the beam splitting function. A light flux (second light flux) reflected by the surface 32 is transmitted through the surface 37 to exit from the second ocular prism 15, and then is introduced to the second exit pupil 13. The light flux introduced to the second exit pupil 13 forms a second split image in the left viewing angle area of the observation viewing angle from the second exit pupil 13.

On the other hand, a light flux (third light flux) transmitted through the surface 32 is transmitted through the second relay lens 10, and the is reversed vertically and horizontally by the first image reversing prism 33 to form an intermediate image 101 near the first reflection mirror 5 (at a position between the first image reversing prism 33 and the first reflection mirror 5). Then, the light flux is reflected by the first reflection mirror 5 to enter the first ocular prism 14 through the surface 31 thereof. The light flux that has entered the first ocular prism 14 is transmitted through the surface 36 to exit from the first ocular prism 14, and then is introduced to the first exit pupil 12.

The light flux introduced to the first exit pupil 12 forms a second split image in the left viewing angle area of the observation viewing angle from the first exit pupil 12.

As described above, this embodiment can display, for each of the left and right (first and second) exit pupils 12 and 13, a combined image formed by joining the two split images to each other which correspond to the two original images formed by the two image-forming elements 1 and 2 common to the left and right exit pupils 12 and 13. In other words, in an HMD for both eyes, a combined image with a wide viewing angle can be displayed by using two image-forming elements.

Also in this embodiment, as in Embodiment 3 it is preferable that an area in the surface 31 of the first ocular prism 14 where the light flux from the first image-forming element 1 is transmitted and reflected be formed as a half mirror while an area therein where the light flux from the second image-forming element 2 is transmitted be not subjected to half mirror processing. Similarly, it is preferable that an area in the surface 32 of the second ocular prism 15 where the light flux from the second image-forming element 2 is transmitted and reflected be formed as a half mirror while an area therein where the light flux from the first image-forming element 1 is transmitted be not subjected to half mirror processing.

Such a configuration can prevent increase of a difference in light amount between the light fluxes reaching the left and right viewing angle areas in the same exit pupil.

Further, also in this embodiment, it is desirable that the reflection by the surface 36 of the first ocular prism 14 and the reflection by the surface 37 of the second ocular prism 15 be internal total reflection. This enables reflection without any loss of light amount, which can display a bright image.

Forming all surfaces constituting the first and second ocular prisms 14 and 15 as curved surfaces which contribute to light collection, light divergence or aberration correction can decrease unnecessary surfaces in the optical system to achieve a cost reduction.

More preferably, forming all surfaces constituting the first and second ocular prisms 14 and 15 as non-rotationally symmetric surfaces increases a degree of freedom for correcting decentration aberration, which makes it possible to display a good quality image. In this case, it is preferable to cause each non-rotationally symmetric surface to have a surface-symmetric shape in a direction of the local sagittal cross section where the local meridional cross section is a unique plane of symmetry. This is because processing of such a surface and manufacturing of the ocular prism can be facilitated more as compared with a case where the surface has no symmetry.

Embodiment 5

Figure 6:
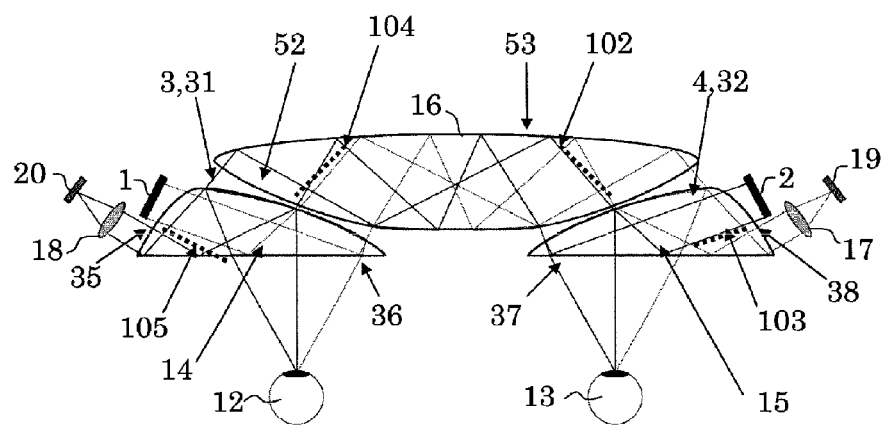
FIG. 6 shows a configuration of an HMD that is Embodiment 5 of the present invention.

FIG. 6 shows a configuration of the HMD of Embodiment 5. In FIG. 6, components identical to or components having functions identical to those in Embodiments 3 and 4 are denoted by the same reference numerals as those in Embodiments 3 and 4.

As in Embodiments 3 and 4, this embodiment folds optical paths by using plural decentered reflective curved surfaces, and uses first and second ocular prisms 14 and 15 having a beam splitting function. However, this embodiment causes light fluxes from first and second image-forming elements 1 and 2 to form intermediate images twice (even number of times) and then introduces the light fluxes to first and second exit pupils 12 and 13. Therefore, image reversing is not performed. Accordingly, when an intermediate image is formed once (odd number of times), an image reversing prism or a time-division shutter is not needed.

Reference numeral 16 denotes a light-introducing prism which respectively introduces light fluxes from the first and second ocular prisms 14 and 15 to the second and first ocular prisms 15 and 14 by plural reflections.

The first and second ocular prisms 14 and 15 respectively correspond to first and second optical elements. Surfaces 31 and 32 of the first and second ocular prisms 14 and 15, the light-introducing prism 16, lenses 17 and 18 described below and reflection mirrors 19 and 20 constitute a relay optical system. Further, the first and second ocular prisms 14 and 15 and the relay optical system constitute an observation optical system.

The light flux from a first original image formed by the first image-forming element 1 enters the first ocular prism 14 through a surface 35 thereof, and then is reflected by a surface 36 of the first ocular prism 14 to be introduced to the surface 31 having the beam splitting function. A light flux (first light flux) reflected by the surface 31 is transmitted through the surface 36 to exit from the first ocular prism 14, and then is introduced to the first exit pupil 12. The light flux introduced to the first exit pupil 12 forms a first split image in a right viewing angle area of an observation viewing angle from the first exit pupil 12.

On the other hand, a light flux (fourth light flux) transmitted through the surface 31 enters the light-introducing prism 16 through a surface 52 thereof, is reflected three times while forming an intermediate image 102 in the light-introducing prism 16, and then is transmitted through the surface 52 to exit from the light-introducing prism 16. Then, the light flux enters the second ocular prism 15 through the surface 32, reflected by a surface 37, and then is transmitted through a surface 38 to exit from the second ocular prism 15.

Further, the light flux is transmitted through the lens 17, reflected by the reflection mirror 19 and then transmitted through the lens 17 again to reenter the second ocular prism 15 through the surface 38. Then, the light flux is reflected by the surface 37 to form a second intermediate image 103, reflected by the surface 32, transmitted through the surface 37 to exit from the second ocular prism 15, and then introduced to the second exit pupil 13. The light flux introduced to the second exit pupil 13 forms a first split image in a right viewing angle area of an observation viewing angle from the second exit pupil 13.

An optical path for introducing the light flux from the first image-forming element 1 to the second exit pupil 13 is as follows:

first image forming element 1→surface 35 (transmission)→surface 36 (reflection)→surface 31 (transmission)→surface 52 (transmission)→surface 53 (reflection)→surface 52 (reflection)→surface 53 (reflection)→surface 52 (transmission)→surface 32 (transmission)→surface 37 (reflection)→surface 38 (transmission)→lens 17→reflection mirror 19→lens 17→surface 38 (transmission)→surface 37 (reflection)→surface 32 (reflection)→surface 37 (transmission)→second exit pupil 13.

The light flux from a second original image formed by the second image-forming element 2 enters the second ocular prism 15 through the surface 38 thereof, and then is reflected by the surface 37 to be introduced to the surface 32 having the beam splitting function. A light flux (second light flux) reflected by the surface 32 is transmitted through the surface 37 to exit from the second ocular prism 15, and then is introduced to the second exit pupil 13. The light flux introduced to the second exit pupil 13 forms a second split image in a left viewing angle area of the observation viewing angle from the second exit pupil 13.

A light flux (third light flux) transmitted through the surface 32 enters the light-introducing prism 16 through the surface 52, is reflected three times while forming an intermediate image 104 in the light-introducing prism 16, and then is transmitted through the surface 52 to exit from the light-introducing prism 16. Then, the light flux enters the first ocular prism 14 through the surface 31, is reflected by the surface 36, and then is transmitted through the surface 35 to exit from the first ocular prism 14.

Further, the light flux is transmitted through the lens 18, reflected by the reflection mirror 20 and then is transmitted through the lens 18 again to reenter the first ocular prism 14 through the surface 35. The light flux is reflected by the surface 36 to form a second intermediate image 105, reflected on the surface 31, transmitted through the surface 36 to exit from the first ocular prism 14, and then is introduced to the first exit pupil 12. The light flux introduced to the first exit pupil 12 forms a second split image in a left viewing angle area of the observation viewing angle from the first exit pupil 12.

An optical path for introducing the light flux from the second image-forming element 2 to the first exit pupil 12 is as follows:

second image forming element 2→surface 38 (transmission)→surface 37 (reflection)→surface 32 (transmission)→surface 52 (transmission)→surface 53 (reflection)→surface 52 (reflection)→surface 53 (reflection)→surface 52 (transmission)→surface 31 (transmission)→surface 36 (reflection)→surface 35 (transmission)→lens 18→reflection mirror 20→lens 18→surface 35 (transmission)→surface 36 (reflection)→surface 31 (reflection)→surface 36 (transmission)→first exit pupil 12.

As described above, this embodiment can display, for each of the left and right (first and second) exit pupils 12 and 13, a combined image formed by joining the two split images to each other which correspond to the two original images formed by the two image-forming elements 1 and 2 common to the left and right exit pupils 12 and 13. In other words, in an HMD for both eyes, a combined image with a wide viewing angle can be displayed by using two image-forming elements.

In this embodiment, the light flux introduced from the first image-forming element 1 to the first exit pupil 12 and the light flux introduced from the first image-forming element 1 to the second exit pupil 13 are reflected or transmitted by the surface 31 and 32 having the beam splitting function once and three times, respectively. The light flux introduced from the second image-forming element 2 to the second exit pupil 13 and the light flux introduced from the second image-forming element 2 to the first exit pupil 12 are reflected or transmitted by the surfaces 31 and 32 having the beam splitting function once and three times, respectively.

Therefore, if the surfaces 31 and 32 having the beam splitting function are formed as half mirrors, amounts of the light fluxes reaching the left and right viewing angle areas in the same exit pupil may be different from each other. Further, since all areas of the surfaces 31 and 32 having the beam splitting function perform reflection and transmission, it is impossible to reduce the above-described difference in amount of the light fluxes (light amount) by presence or absence of half mirror processing, which is different from the cases of Embodiments 3 and 4.

Thus, in this embodiment, in an area reflecting and transmitting the light flux from the first image-forming element 1 in the surface 31 having the beam splitting function, a ratio of reflectance and transmittance is set to r1:1−r1. Further, in an area reflecting and transmitting the light flux from the second image-forming element 2 in the surface 31, a ratio of reflectance and transmittance is set to r2:1−r2.

Moreover, in an area reflecting and transmitting the light flux from the second image-forming element 2 in the surface 32 having the beam splitting function, a ratio of reflectance and transmittance is set to r1:1−r1. Further, in an area reflecting and transmitting the light flux from the first image-forming element 1 in the surface 32, a ratio of reflectance and transmittance is set to r2:1−r2.

In this case, in order to reduce the difference in light amount between the left and right viewing angle areas in the same exit pupil, it is desirable to satisfy the following condition:

$$r1=(1-r1)\cdot r2\cdot(1-r2) \quad (1)$$

Further, in order to satisfy the condition (1), the following condition needs to be satisfied:

$$r1 \leq 0.2 \quad (2)$$

Satisfying the conditions (1) and (2) enables observation of an image in which the light amounts in the left and right viewing angle areas are equal to each other.

As described above, in this embodiment, the entire effective area of the surface having the beam spitting function is formed as a half mirror having a ratio of reflectance and transmittance different from 50:50. This makes it possible to reduce a difference in brightness between a split image displayed through only the ocular prism and a split image displayed through the light-introducing prism 16 which forms an intermediate image thereinside. As a result, a combined image having almost uniform brightness can be displayed for each of the left and right eyes.

Also in this embodiment, it is desirable that the reflection by the surface 36 of the first ocular prism 14 and the reflection by the surface 37 of the second ocular prism 15 be internal total reflection. This enables reflection without any loss of light amount, which can display a bright image.

Further, it is desirable that the reflection by the surface 53 of the light-introducing prism 16 be mirror reflection by a reflective film, and that, in the surface 52 thereof, a reflective film be formed in only an area reflecting the light flux to perform mirror reflection and half mirror processing be not performed in other areas. This can reduce loss of light amount due to transmission and reflection at the light-introducing prism 16.

Moreover, forming all surfaces constituting the first and second ocular prisms 14 and 15 as curved surfaces which contribute to light collection, light divergence or aberration correction can decrease unnecessary surfaces in the optical system to achieve a cost reduction.

More preferably, forming all surfaces constituting the first and second ocular prisms 14 and 15 as non-rotationally symmetric surfaces increases a degree of freedom for correcting decentration aberration, which makes it possible to display a good quality image. In this case, it is preferable to cause each non-rotationally symmetric surface to have a surface-symmetric shape in a direction of the local sagittal cross section where the local meridional cross section is a unique plane of symmetry. This is because processing of such a surface and manufacturing of the ocular prism can be facilitated more as compared with a case where the surface has no symmetry.

Hereinafter, numerical examples of Embodiments 3 and 4 will be described.

Numerical Example 1

Figure 7:
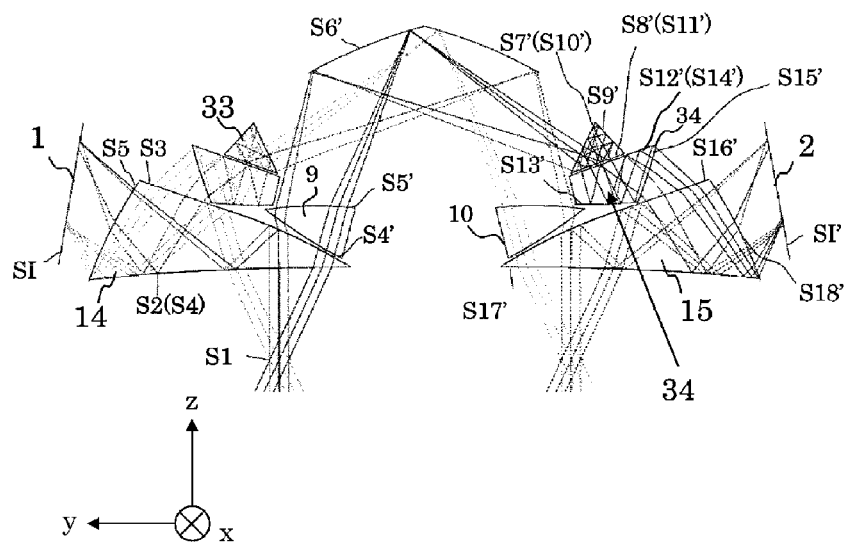
FIG. 7 is an optical sectional view showing Numerical Example 1 of Embodiment 3.

FIG. 7 shows Numerical Example 1 of Embodiment 3 shown in FIG. 3. In Numerical Example 1 and other numerical examples described below, description will be made by reverse ray tracing that traces a light ray from an exit pupil to each image-forming element as an image surface.

In FIG. 7, reference numerals 14 and 15 denote first and second ocular prisms having a beam splitting function, each of which is formed of a transparent member (optical element) having three surfaces. Reference characters S2 and S4 denote a same surface, and reference characters S3 and S16' denote surfaces having the beam splitting function. Reference numerals 9 and 10 denote first and second relay lenses.

Reference numerals 33 and 34 denote first and second image reversing prisms which are Schmidt prisms, each being formed by two transparent members having prism shapes. Reference characters S7' and S10' denote a same surface, and reference characters S8' and S11' denote a same surface. Reference characters S12' and S14' denote a same surface.

Reference characters SI and SI' denote image-forming surfaces (image display surfaces) in first and second image-forming elements 1 and 2. Reference character S1 denotes a first exit pupil.

As described in Embodiment 3, in order to reduce a difference in light amount between left and right viewing angle areas, in the surface S3 having the beam splitting function in the first ocular prism 14, an area transmitting and reflecting a light ray from the first image-forming element 1 is formed as a half mirror. However, in the surface S3, an area transmitting a light ray from the second image-forming element 2 is not formed as a half mirror.

Similarly, in the surface S16' having the beam splitting function in the second ocular prism 15, an area transmitting and reflecting a light ray from the second image-forming element 2 is formed as a half mirror. However, in the surface S16', an area transmitting a light ray from the first image-forming element 1 is not formed as a half mirror.

Further, reflection by the surface S4 of the first ocular prism 14 and reflection by the surface S17' of the second ocular prism 15 are internal total reflections.

As can be understood from FIG. 7, in this numerical example, the surface S3 does not include an overlapped area between the area transmitting the light ray from the first image-forming element 1 and the area reflecting the light ray from the first image-forming element 1. Therefore, a reflective film is formed only in the reflecting area to provide a reflectance of 100%, while other areas are not formed as half mirror areas to eliminate an area to be subjected to half mirror processing from the surface S3. As a result, loss of light amount at the half mirror can be reduced to display a bright image.

As described above, a partial area of a surface having the beam splitting function (hereinafter referred to as "beam splitting surface") is formed as an area having only a reflecting function, and other areas are formed as areas having only a transmitting function. This makes it possible to utilize only the reflecting function of the beam splitting surface in an optical path for introducing a light ray from one image-forming element to the exit pupil through only the ocular prism, and to utilize only the transmitting function of the beam splitting surface in an optical path for introducing a light ray from the other image-forming element to the exit pupil via intermediate image formation.

Accordingly, an observation optical system can be realized in which split images displayed in left and right viewing angle areas are equal to each other in light amount, in other words, a combined image having entirely uniform light amount obtained by combining (joining) such split images is displayed, and almost no loss of light amount occurs.

In this numerical example, the surfaces S2, S3, S4, S5, S13', S15', S16', S17' and S18' are non-rotationally symmetric surfaces each having a surface-symmetric shape in which a paper surface (y-z cross section) of FIG. 7 is a unique plane of symmetry. Table 1 shows optical data of Numerical Example 1.

TABLE 1

| SURF | X | Y | Z | A | R | TYP | Nd | vd |
|---|---|---|---|---|---|---|---|---|
| 1 | 0.000 | 0.000 | 0.000 | 0.000 | | | | |
| 2 | 0.000 | −15.000 | 20.000 | 0.000 | −651.3657 | FFS1 | 1.5709 | 33.8 |
| 3 | 0.000 | −26.000 | 12.500 | −38.000 | −120.0000 | FFS2 | −1.5709 | 33.8 |
| 4 | 0.000 | −15.000 | 20.000 | 0.000 | −651.3657 | FFS1 | −1.5709 | 33.8 |
| 5 | 0.000 | 35.000 | 30.000 | 62.000 | −100.0000 | FFS3 | 1.0000 | 0.0 |
| I | 0.000 | 45.000 | 33.000 | 80.000 | | | | |
| 3 | 0.000 | −26.000 | 12.500 | −38.000 | −120.0000 | FFS2 | 1.0000 | 0.0 |
| 4' | 0.000 | 8.000 | 37.000 | −45.000 | 80.0000 | SPH | 1.5709 | 33.8 |
| 5' | 0.000 | −8.000 | 33.000 | 0.000 | −80.0000 | SPH | 1.0000 | 0.0 |
| 6' | 0.000 | −31.500 | 71.500 | 14.000 | −100.0000 | SPH | −1.0000 | 0.0 |
| 7' | 0.000 | −70.000 | 55.000 | 65.000 | ∞ | SPH | 1.5709 | 33.8 |
| 8' | 0.000 | −100.000 | 53.500 | 20.000 | ∞ | SPH | −1.5709 | 33.8 |
| 9' | 0.000 | −70.000 | 49.000 | −47.500 | ∞ | SPH | −1.5709 | 33.8 |
| 10' | 0.000 | −70.000 | 55.000 | 65.000 | ∞ | SPH | −1.5709 | 33.8 |
| 11' | 0.000 | −100.000 | 53.500 | 20.000 | ∞ | SPH | 1.0000 | |
| 12' | 0.000 | −102.000 | 53.750 | 20.000 | ∞ | SPH | 1.5709 | 33.8 |
| 13' | 0.000 | −85.000 | 34.750 | 9.250 | 120.0000 | FFS4 | −1.5709 | 33.8 |
| 14' | 0.000 | −102.000 | 53.750 | 20.000 | ∞ | SPH | −1.5709 | 33.8 |
| 15' | 0.000 | −79.500 | 40.000 | 72.000 | 100.0000 | FFS5 | 1.0000 | |
| 16' | 0.000 | −37.000 | 12.500 | 38.000 | −120.0000 | FFS2 | 1.5709 | 33.8 |
| 17' | 0.000 | −48.000 | 20.000 | 0.000 | −651.3657 | FFS1 | −1.5709 | 33.8 |
| 18' | 0.000 | −98.000 | 30.000 | −62.000 | −100.0000 | FFS3 | 1.0000 | |
| I' | 0.000 | −108.000 | 33.000 | −80.000 | | | | |

FFS1 c1: 4.1342e−005   c5: −2.6683e−009   c6: 5.2262e−013   c10: 4.5926e−011
     c11: −1.3236e−011  c12: −1.3089e−012  c13: −7.4377e−011  c14: −5.5821e−015
FFS2 c1: 2.9165e−007   c5: 30028e−008    c6: −9.6849e−015   c10: −3.5009e−010
     c11: 4.5330e−010   c12: −3.8689e−010  c13: 4.4267e−011   c14: −8.3741e−015
FFS3 c1: −5.9395e−014  c5: −1.0666e−009  c6: 2.0436e−009    c10: 1.2183e−011
     c11: −4.5982e−008  c12: 4.6273e−013   c13: −2.0440e−010  c14: 2.7727e−014
FFS4 c1: −1.2081e−012  c5: 1.0697e−008   c6: −1.7277e−008   c10: −1.1423e−008
     c11: 1.6114e−006   c12: −7.5477e−008  c13: 1.2156e−008   c14: −4.4666e−009
FFS5 c1: −1.3261e−014  c5: 2.7231e−009   c6: −5.4408e−009   c10: −2.2522e−008
     c11: 7.7276e−009   c12: −1.0249e−007  c13: 4.9381e−007   c14: −5.3970e−007

Numerical Example 1 of Table 1 shows an observation optical system which has an exit pupil diameter of Φ4 mm and an image display size (original image size) of about 28 mm×20 mm in each image-forming element, and which displays a combined image with a horizontal viewing angle of 50° and a vertical viewing angle of 38.5° at an infinite distance in a positive direction of a z axis (visual axis).

In Numerical Example 1, the horizontal viewing angle is divided into two viewing angle areas, and an image-forming element is provided for each of the two viewing angle areas. In other words, each of the first and second image-forming elements 1 and 2 forms an original image corresponding to a horizontal viewing angle of 25°. The vertical viewing angle is not divided, and hence each of the first and second image-forming elements 1 and 2 forms an original image corresponding to a vertical viewing angle of 38.5°.

A distance between the left and right exit pupils is set to 63 mm, and the observation optical system is configured to be left and right symmetric.

A leftmost item SURF in the optical data of Table 1 and other Tables described below denotes a surface number from the exit pupil (first surface) S1. X, Y, Z and A respectively denote, with a center of the first surface S1 set as an original point (0, 0, 0), an apex position (x, y, z) of each surface in a coordinate system having y and z axis shown in the figure and an x axis extending in a direction orthogonal to a paper surface of the figure, and a rotational angle A (°) around the x axis in which a counterclockwise direction in the figure is a positive direction.

R denotes a curvature radius of each surface. An item TYP denotes a shape type of each surface, SPH denotes that the surface is a spherical surface, and FFS denotes that the surface is a non-rotationally symmetric surface according to the following expression.

$$FFS:$$
$$z = (1/R)*(x^2+y^2)/\left(1+(1-(1+k)*(1/R)^2*(x^2+y^2))^{(1/2)}\right) +$$
$$c2 + c4*y + c5*(x^2 - y^2) + c6*(-1 + 2*x^2 + 2*y^2) +$$
$$c10*(-2*y + 3*x^2*y + 3*y^3) + c11*(3*x^2*y - y^3) +$$
$$c12*(x^4 - 6*x^2*y^2 + y^4) + c13*(-3*x^2 + 4*x^4 + 3*y^2 - 4*y^4) +$$
$$c14*(1 - 6*x^2 + 6*x^4 - 6*y^2 + 12*x^2*y^2 + 6*y^4) +$$
$$c20*(3*y - 12*x^2*y + 10*x^4*y - 12*y^3 + 20*x^2*y^3 + 10*y^5) +$$
$$c21*(-12*x^2*y + 15*x^4*y + 4*y^3 + 10*x^2*y^3 - 5*y^5) +$$
$$c22*(5*x^4*y - 10*x^2*y^3 + y^5) +$$
$$c23*(x^6 - 15*x^4*y^2 + 15*x^2*y^4 - y^6) +$$
$$c24*(-5*x^4 + 6*x^6 + 30*x^2*y^2 - 30*x^4*y^2 - 5*y^4 -$$
$$30*x^2*y^4 + 6*y^6) + c25*(6*x^2 - 20*x^4 + 15*x^6 -$$
$$6*y^2 + 15*x^4*y^2 + 20*y^4 - 15*x^2*y^4 - 15*y^6) +$$
$$c26*(-1 + 12*x^2 - 30*x^4 + 20*x^6 + 12*y^2 - 60*x^2*y^2 +$$
$$60*x^4*y^2 - 30*y^4 + 60*x^2*y^4 + 20*y^6) + \ldots$$

A surface in which FFSn (n=1, 2, 3, . . . ) is written in its section of TYP has a non-rotationally symmetric shape corresponding to aspheric coefficients k and ci (i=1, 5, 6, 10, 11, 12, 13 and 14) in a same FFSn written in a lower section of Table 1. "e±X" means "×10^{±x}".

Nd and vd (vd in Table) respectively denote a refractive index and an Abbe number for a d-line of a medium forming the surface and subsequent region. A change in sign of the refractive index Nd indicates that light is reflected on the surface. When a medium is air, the refractive index Nd is written as 1.000 and the Abbe number vd is written as 0.0.

Numerical Example 2

Figure 8:
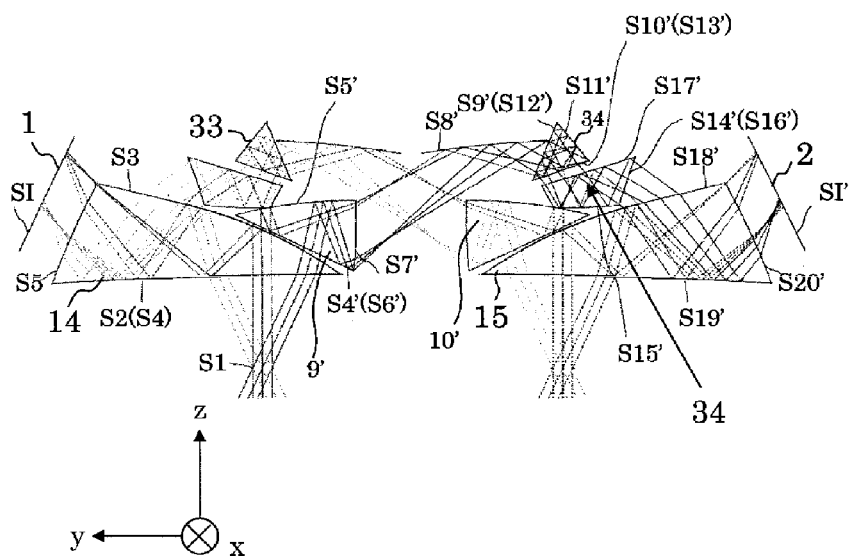
FIG. 8 is an optical sectional view showing Numerical Example 2 of Embodiment 3.

FIG. 8 shows an optical section of Numerical Example 2 of Embodiment 3 shown in FIG. 3.

Reference numerals 14 and 15 denote first and second ocular prisms. Reference characters S2 and S4 denote a same surface, and reference characters S3 and S18' denote beam splitting surfaces.

Reference numerals 9' and 10' denote first and second relay prisms used in place of the first and second relay lenses 9 and 10 in Numerical Example 1. Each of the first and second relay prisms 9' and 10' is formed of a transparent member (optical element) having three surfaces. Reference characters S4' and S6' denote a same surface.

Reference numerals 33 and 34 denote first and second image reversing prisms which are Schmidt prisms having an image reversing function. Each of the first and second image reversing prisms 33 and 34 is formed of two transparent member having prism shapes. Reference characters S9' and S12' denote a same surface, and Reference characters S10' and S13' denote a same surface. Reference characters S14' and S16' denote a same surface.

Reference characters SI and SI' denote image-forming surfaces (image display surfaces) of first and second image-forming elements 1 and 2. Reference character S1 denotes a first exit pupil.

As described in Embodiment 3, in order to reduce a difference in light amount between left and right viewing angle areas, in the beam splitting surface S3 of the first ocular prism 14, an area transmitting and reflecting a light ray from the first image-forming element 1 is formed as a half mirror. However, in the beam splitting surface S3, an area transmitting a light ray from the second image-forming element 2 is not formed as a half mirror.

Similarly, in the beam splitting surface S18' of the second ocular prism 15, an area transmitting and reflecting a light ray from the second image-forming element 2 is formed as a half mirror. However, in the beam splitting surface S18', an area transmitting a light ray from the first image-forming element 1 is not formed as a half mirror.

Further, reflection by the surface S4 of the first ocular prism 14, reflection by the surface S6' of the first relay prism 9' and reflection by the surface S19' of the second ocular prism 15 are internal total reflections.

In this numerical example, the surfaces S2, S3, S4, S5, S18', S19' and S20' are non-rotationally symmetric surfaces, each having a surface-symmetric shape in which a paper surface (y-z cross section) of FIG. 8 is a unique plane of symmetry. Table 2 shows optical data of Numerical Example 2.

TABLE 2

| SURF | X | Y | Z | A | R | TYP | Nd | vd |
|---|---|---|---|---|---|---|---|---|
| 1 | 0.000 | 0.000 | 0.000 | 0.000 | | | | |
| 2 | 0.000 | −15.000 | 20.000 | 0.000 | −649.9984 | FFS1 | 1.5709 | 33.8 |
| 3 | 0.000 | −26.000 | 12.500 | −42.000 | −100.0000 | FFS2 | −1.5709 | 33.8 |
| 4 | 0.000 | −15.000 | 20.000 | 0.000 | −649.9984 | FFS1 | −1.5709 | 33.8 |
| 5 | 0.000 | 39.000 | 30.000 | 65.000 | −150.0000 | FFS3 | 1.0000 | 0.0 |
| I | 0.000 | 47.000 | 33.000 | 64.000 | | | | |
| 3 | 0.000 | −26.000 | 12.500 | −42.000 | −100.0000 | FFS2 | 1.0000 | 0.0 |
| 4' | 0.000 | 8.000 | 33.500 | −25.000 | ∞ | SPH | 1.5709 | 33.8 |
| 5' | 0.000 | −10.000 | 35.000 | 5.000 | −100.0000 | SPH | −1.5709 | 33.8 |
| 6' | 0.000 | 8.000 | 33.500 | −25.000 | ∞ | SPH | −1.5709 | 33.8 |
| 7' | 0.000 | −15.000 | 0.000 | −108.000 | −100.0000 | SPH | 1.0000 | 0.0 |

TABLE 2-continued

| | | | | | | | | |
|---|---|---|---|---|---|---|---|---|
| 8' | 0.000 | −60.000 | 48.000 | 2.000 | −200.0000 | SPH | −1.0000 | 0.0 |
| 9' | 0.000 | −64.500 | 57.500 | 67.000 | ∞ | SPH | 1.5709 | 33.8 |
| 10' | 0.000 | −66.500 | 43.000 | 20.000 | ∞ | SPH | −1.5709 | 33.8 |
| 11' | 0.000 | −66.000 | 47.000 | −51.000 | ∞ | SPH | −1.5709 | 33.8 |
| 12' | 0.000 | −64.500 | 57.500 | 67.000 | ∞ | SPH | −1.5709 | 33.8 |
| 13' | 0.000 | −66.500 | 43.000 | 20.000 | ∞ | SPH | 1.0000 | 0.0 |
| 14' | 0.000 | −67.000 | 41.000 | 17.250 | ∞ | SPH | 1.5709 | 33.8 |
| 15' | 0.000 | −70.000 | 34.000 | 3.000 | 119.9999 | SPH | −1.5709 | 33.8 |
| 16' | 0.000 | −67.000 | 41.000 | 17.250 | ∞ | SPH | −1.5709 | 33.8 |
| 17' | 0.000 | −77.750 | 42.500 | 70.000 | −150.0005 | SPH | 1.0000 | 0.0 |
| 18' | 0.000 | −37.000 | 12.500 | 42.000 | −100.0000 | FFS2 | 1.5709 | 33.8 |
| 19' | 0.000 | −48.000 | 20.000 | 0.000 | −649.9984 | FFS1 | −1.5709 | 33.8 |
| 20' | 0.000 | −102.000 | 30.000 | −65.000 | −150.0000 | FFS3 | 1.0000 | 0.0 |
| I' | 0.000 | −110.000 | 33.000 | −64.000 | | | | |

| | | | | |
|---|---|---|---|---|
| FFS1 | c1: −2.2820e−002 | c5: 3.1150e−007 | c6: −5.9431e−011 | c10: −1.1101e−008 |
| | c11: 1.7011e−009 | c12: 1.0062e−007 | c13: 1.4281e−009 | c14: 2.7284e−012 |
| FFS2 | c1: −3.1106e−005 | c5: 1.0338e−004 | c6: −8.7279e−012 | c10: −2.9032e−006 |
| | c11: −3.1865e−006 | c12: 2.1645e−008 | c13: −1.0581e−008 | c14: 7.7930e−013 |
| FFS3 | c1: 5.8410e−007 | c5: 8.7627e−007 | c6: −7.1601e−012 | c10: 6.2690e−011 |
| | c11: −2.4183e−007 | c12: −2.7978e−012 | c13: 1.5667e−011 | c14: −1.0456e−015 |

Numerical Example 2 of Table 2 shows an observation optical system which has an exit pupil diameter of Φ4 mm and an image display size (original image size) of about 24 mm×12 mm in each image-forming element, and which displays a combined image with a horizontal viewing angle of 50° and a vertical viewing angle of 38.5° at an infinite distance in a positive direction of a z axis (visual axis).

In Numerical Example 2, the horizontal viewing angle is divided into two viewing angle areas, and an image-forming element is provided for each of the two viewing angle areas. In other words, each of the first and second image-forming elements 1 and 2 forms an original image corresponding to a horizontal viewing angle of 25°. The vertical viewing angle is not divided, and hence each of the first and second image-forming elements 1 and 2 forms an original image corresponding to a vertical viewing angle of 38.5°.

A distance between the left and right exit pupils is set to 63 mm, and the observation optical system is configured to be left and right symmetric.

Numerical Example 3

Figure 9:
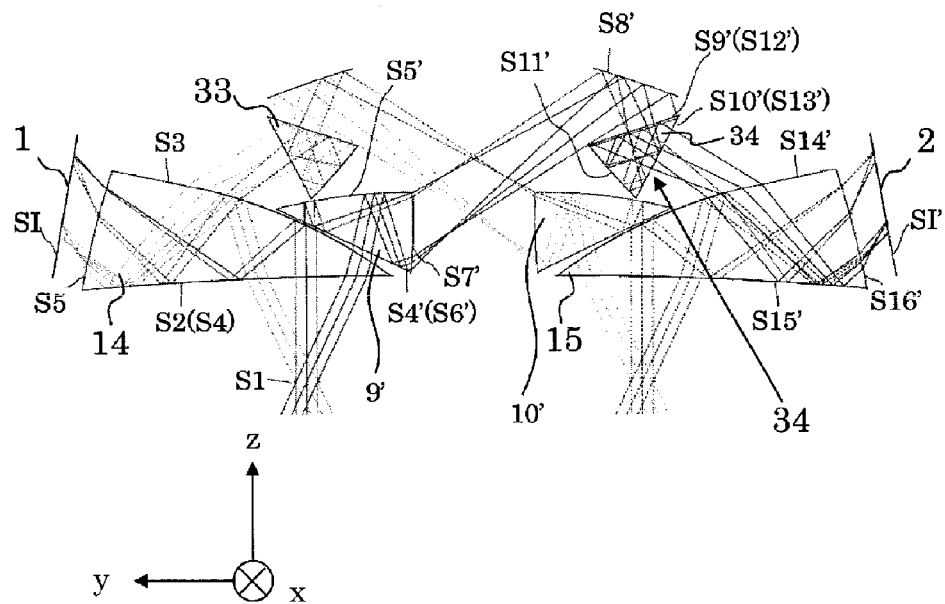
FIG. 9 is an optical sectional view showing Numerical Example 3 of Embodiment 3.

FIG. 9 shows an optical section of Numerical Example 3 of Embodiment 3 shown in FIG. 3.

Reference numerals 14 and 15 denote first and second ocular prisms having a beam splitting function, each of which is formed of a transparent member (optical element) having three surfaces. Reference characters S2 and S4 denote a same surface, and reference characters S3 and S14' denote beam splitting surfaces.

Reference numerals 9' and 10' denote first and second relay prisms used in place of the first and second relay lenses 9 and 10 in Numerical Example 1. Each of the first and second relay prisms 9' and 10' is formed of a transparent member (optical element) having three surfaces. Reference characters S4' and S6' denote a same surface.

Reference numerals 33 and 34 denote first and second image reversing prisms each having two reflection functions added to a Dach prism. Each of the first and second image reversing prisms 33 and 34 is formed of a transparent member having one prism shape. Reference characters S9' and S12' denote a same surface, and reference characters S10' and S13' denote a same surface.

Reference characters SI and SI' denote image-forming surfaces (image display surfaces) of first and second image-forming elements 1 and 2. Reference character S1 denotes a first exit pupil.

As described in Embodiment 3, in order to reduce a difference in light amount between left and right viewing angle areas, in the beam splitting surface S3 of the first ocular prism 14, an area transmitting and reflecting a light ray from the first image-forming element 1 is formed as a half mirror. However, in the beam splitting surface S3, an area transmitting a light ray from the second image-forming element 2 is not formed as a half mirror.

Similarly, in the beam splitting surface S14' of the second ocular prism 15, an area transmitting and reflecting a light ray from the second image-forming element 2 is formed as a half mirror. However, in the beam splitting surface S14', an area transmitting a light ray from the first image-forming element 1 is not formed as a half mirror.

Further, reflection by the surface S4 of the first ocular prism 14, reflection by the surface S6' of the first relay prism 9' and reflection by the surface S15' of the second ocular prism 15 are internal total reflections.

In this numerical example, the surfaces S2, S3, S4, S5, S14', S15' and S16' are non-rotationally symmetric surfaces, each having a surface-symmetric shape in which a paper surface (y-z cross section) of FIG. 9 is a unique plane of symmetry. Table 3 shows optical data of Numerical Example 3.

TABLE 3

| SURF | X | Y | Z | A | R | TYP | Nd | vd |
|---|---|---|---|---|---|---|---|---|
| 1 | 0.000 | 0.000 | 0.000 | 0.000 | | | | |
| 2 | 0.000 | −15.000 | 20.000 | 0.000 | −649.9943 | FFS1 | 1.5709 | 33.8 |
| 3 | 0.000 | −26.000 | 11.500 | −43.500 | −100.0000 | FFS2 | −1.5709 | 33.8 |
| 4 | 0.000 | −15.000 | 20.000 | 0.000 | −649.9943 | FFS1 | −1.5709 | 33.8 |
| 5 | 0.000 | 39.000 | 30.000 | 75.000 | −200.0000 | FFS3 | 1.0000 | 0.0 |
| I | 0.000 | 45.000 | 33.000 | 80.000 | | | | |
| 3 | 0.000 | −26.000 | 11.500 | −43.500 | −100.0000 | FFS2 | 1.0000 | 0.0 |

TABLE 3-continued

| | | | | | | | | |
|---|---|---|---|---|---|---|---|---|
| 4' | 0.000 | 8.000 | 33.500 | −25.000 | ∞ | SPH | 1.5709 | 33.8 |
| 5' | 0.000 | −10.000 | 35.000 | 5.000 | −100.0000 | SPH | −1.5709 | 33.8 |
| 6' | 0.000 | 8.000 | 33.500 | −25.000 | ∞ | SPH | −1.5709 | 33.8 |
| 7' | 0.000 | −20.000 | 30.000 | −90.000 | −100.0000 | SPH | 1.0000 | 0.0 |
| 8' | 0.000 | −65.000 | 55.000 | −20.000 | −200.0000 | SPH | −1.0000 | 0.0 |
| 9' | 0.000 | −65.000 | 48.000 | 18.000 | ∞ | SPH | 1.5709 | 33.8 |
| 10' | 0.000 | −69.750 | 49.000 | −117.750 | 4.8334e+8 | SPH | −1.5709 | 33.8 |
| 11' | 0.000 | −61.250 | 35.000 | −46.000 | 120.0000 | SPH | −1.5709 | 33.8 |
| 12' | 0.000 | −65.000 | 48.000 | 18.000 | ∞ | SPH | −1.5709 | 33.8 |
| 13' | 0.000 | −69.750 | 49.000 | −117.750 | 4.8334e+8 | SPH | 1.0000 | 0.0 |
| 14' | 0.000 | −37.000 | 11.500 | 43.500 | −100.0000 | FFS2 | 1.5709 | 33.8 |
| 15' | 0.000 | −48.000 | 20.000 | 0.000 | −649.9943 | FFS1 | −1.5709 | 33.8 |
| 16' | 0.000 | −102.000 | 30.000 | −75.000 | −200.0000 | FFS3 | 1.0000 | 0.0 |
| I' | 0.000 | −108.000 | 33.000 | −80.000 | | | | |

| | | | | |
|---|---|---|---|---|
| FFS1 | $c1: -2.9588e-003$ | $c5: -2.4506e-008$ | $c6: 5.0508e-012$ | $c10: 5.9260e-009$ |
| | $c11: -3.0693e-010$ | $c12: 4.5089e-011$ | $c13: -1.1673e-009$ | $c14: 4.3820e-013$ |
| FFS2 | $c1: 5.6763e-006$ | $c5: -2.0189e-006$ | $c6: 1.6634e-013$ | $c10: 5.2922e-008$ |
| | $c11: 1.3231e-007$ | $c12: -2.8838e-009$ | $c13: 6.3699e-010$ | $c14: -6.3509e-014$ |
| FFS3 | $c1: -3.0051e-015$ | $c5: -2.4013e-009$ | $c6: 4.6428e-009$ | $c10: 2.5471e-011$ |
| | $c11: -8.9320e-008$ | $c12: 1.9153e-015$ | $c13: -1.7451e-008$ | $c14: 1.1336e-014$ |

Numerical Example 3 of Table 3 shows an observation optical system which has an exit pupil diameter of Φ4 mm and an image display size (original image size) of about 26 mm×16 mm in each image-forming element, and which displays a combined image with a horizontal viewing angle of 50° and a vertical viewing angle of 38.5° at an infinite distance in a positive direction of a z axis (visual axis).

In Numerical Example 3, the horizontal viewing angle is divided into two viewing angle areas, and an image-forming element is provided for each of the two viewing angle areas. In other words, each of the first and second image-forming elements 1 and 2 forms an original image corresponding to a horizontal viewing angle of 25°. The vertical viewing angle is not divided, and hence each of the first and second image-forming elements 1 and 2 forms an original image corresponding to a vertical viewing angle of 38.5°.

A distance between the left and right exit pupils is set to 63 mm, and the observation optical system is configured to be left and right symmetric.

Numerical Example 4

Figure 10:
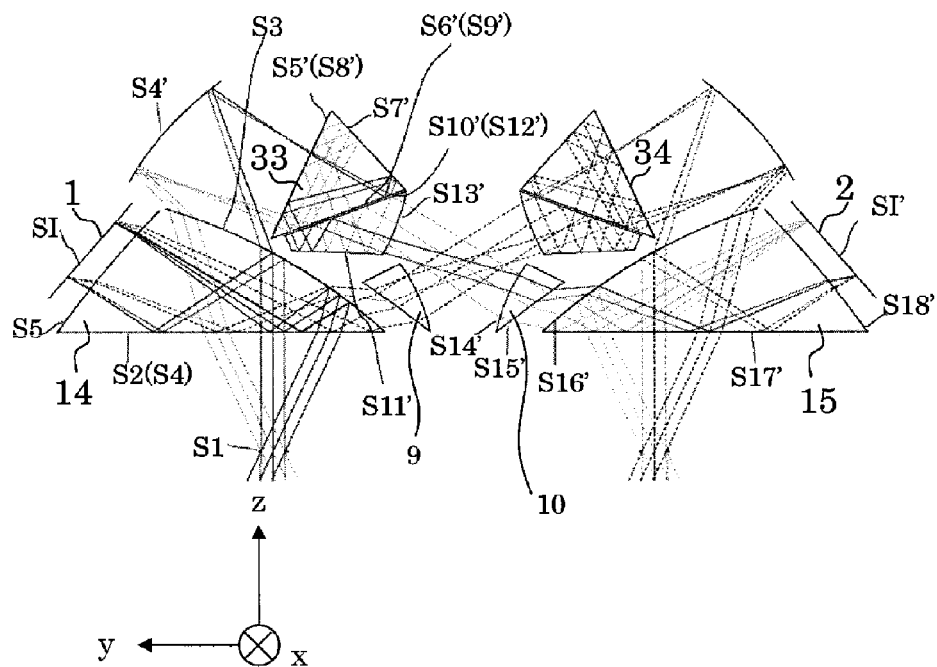
FIG. 10 is an optical sectional view showing a numerical example of Embodiment 4.

FIG. 10 shows an optical section of a numerical example (Numerical Example 4) of Embodiment 4 shown in FIG. 5.

Reference numerals 14 and 15 denote first and second ocular prisms. Reference characters S2 and S4 denote a same surface, and Reference characters S3 and S16' denote beam splitting surfaces. Reference numerals 9 and 10 denote first and second relay lenses.

Reference numerals 33 and 34 denote first and second image reversing prisms which are Schmidt prisms having an image reversing function. Each of the image reversing prisms 33 and 34 is formed of two transparent members having prism shapes. Reference characters S5' and S8' denote a same surface, and reference characters S6' and S9' denote a same surface. Reference characters S10' and S12' denote a same surface.

Reference characters SI and SI' denote image-forming surfaces (image display surfaces) of first and second image-forming elements 1 and 2. Reference character S1 denotes a first exit pupil.

As described in Embodiment 4, in order to reduce a difference in light amount between left and right viewing angle areas, in the beam splitting surface S3 of the first ocular prism 14, an area transmitting and reflecting a light ray from the first image-forming element 1 is formed as a half mirror. However, in the beam splitting surface S3, an area transmitting a light ray from the second image-forming element 2 is not formed as a half mirror.

Similarly, in the beam splitting surface S16' of the second ocular prism 15, an area transmitting and reflecting a light ray from the second image-forming element 2 is formed as a half mirror. However, in the beam splitting surface S16', an area transmitting a light ray from the first image-forming element 1 is not formed as a half mirror.

Further, reflection by the surface S4 of the first ocular prism 14 and reflection by the surface S17' of the second ocular prism 15 are internal total reflections.

In this numerical example, the surfaces S3, S5, S16' and S18' are non-rotationally symmetric surfaces, each having a surface-symmetric shape in which a paper surface (y-z cross section) of FIG. 10 is a unique plane of symmetry. Table 4 shows optical data of Numerical Example 4.

TABLE 4

| SURF | X | Y | Z | A | R | TYP | Nd | vd |
|---|---|---|---|---|---|---|---|---|
| 1 | 0.000 | 0.000 | 0.000 | 0.000 | | | | |
| 2 | 0.000 | −15.000 | 20.000 | 0.000 | −1.1493e+10 | SPH | 1.5709 | 33.8 |
| 3 | 0.000 | −26.000 | 12.500 | −48.000 | −100.0000 | FFS1 | −1.5709 | 33.8 |
| 4 | 0.000 | −15.000 | 20.000 | 0.000 | −1.1493e+10 | SPH | −1.5709 | 33.8 |
| 5 | 0.000 | 28.000 | 29.538 | 49.995 | −159.0568 | FFS2 | 1.0000 | 0.0 |
| I | 0.000 | 32.000 | 31.000 | 48.709 | | | | |
| 3 | 0.000 | −26.000 | 12.500 | −48.000 | −100.0000 | FFS1 | 1.0000 | 0.0 |
| 4' | 0.000 | 20.000 | 50.000 | 53.000 | −55.0000 | SPH | −1.0000 | 0.0 |
| 5' | 0.000 | −2.000 | 40.000 | 65.000 | ∞ | SPH | 1.5709 | 33.8 |
| 6' | 0.000 | −10.000 | 39.000 | 20.000 | ∞ | SPH | −1.5709 | 33.8 |
| 7' | 0.000 | −14.000 | 52.000 | −47.500 | ∞ | SPH | −1.5709 | 33.8 |

TABLE 4-continued

| | | | | | | | | |
|---|---|---|---|---|---|---|---|---|
| 8' | 0.000 | −2.000 | 40.000 | 65.000 | ∞ | SPH | −1.5709 | 33.8 |
| 9' | 0.000 | −10.000 | 39.000 | 20.000 | ∞ | SPH | 1.0000 | 0.0 |
| 10' | 0.000 | −11.000 | 39.000 | 20.000 | ∞ | SPH | 1.5709 | 33.8 |
| 11' | 0.000 | −10.000 | 33.000 | −2.500 | ∞ | SPH | −1.5709 | 33.8 |
| 12' | 0.000 | −11.000 | 39.000 | 20.000 | ∞ | SPH | −1.5709 | 33.8 |
| 13' | 0.000 | −16.496 | 29.992 | 55.391 | 36.6566 | SPH | 1.0000 | 0.0 |
| 14' | 0.000 | −36.500 | 15.469 | 88.297 | −26.6816 | SPH | 1.5709 | 33.8 |
| 15' | 0.000 | −42.500 | 24.047 | 35.546 | −243.5657 | SPH | 1.0000 | 0.0 |
| 16' | 0.000 | −37.000 | 12.500 | 48.000 | −100.0000 | FFS1 | 1.5709 | 33.8 |
| 17' | 0.000 | −48.000 | 20.000 | 0.000 | −1.1493e+10 | SPH | −1.5709 | 33.8 |
| 18' | 0.000 | −91.000 | 29.538 | −49.995 | −159.0568 | FFS2 | 1.0000 | 0.0 |
| I' | 0.000 | −95.000 | 31.000 | −48.709 | | | | |

FFS1  c1: 3.2757e−006    c5: 7.3232e−005   c6: 1.4465e−010    c10: −3.3996e−007
      c11: 2.7624e−006   c12: 1.0454e−008  c13: −2.8545e−009  c14: 5.5150e−013
FFS2  c1: −2.8503e−004   c5: −1.8079e−006  c6: 7.9042e−010    c10: −3.3051e−009
      c11: −5.0758e−008  c12: 8.8878e−010  c13: −1.0388e−009  c14: 8.8741e−013

Numerical Example 4 of Table 4 shows an observation optical system which has an exit pupil diameter of Φ4 mm and an image display size (original image size) of about 24 mm×12 mm in each image-forming element, and which displays a combined image with a horizontal viewing angle of 50° and a vertical viewing angle of 38.5° at an infinite distance in a positive direction of a z axis (visual axis).

In Numerical Example 4, the horizontal viewing angle is divided into two viewing angle areas, and an image-forming element is provided for each of the two viewing angle areas. In other words, each of the first and second image-forming elements 1 and 2 forms an original image corresponding to a horizontal viewing angle of 25°. The vertical viewing angle is not divided, and hence each of the first and second image-forming elements 1 and 2 forms an original image corresponding to a vertical viewing angle of 38.5°.

A distance between the left and right exit pupils is set to 63 mm, and the observation optical system is configured to be left and right symmetric.

Embodiment 6

Figure 11:
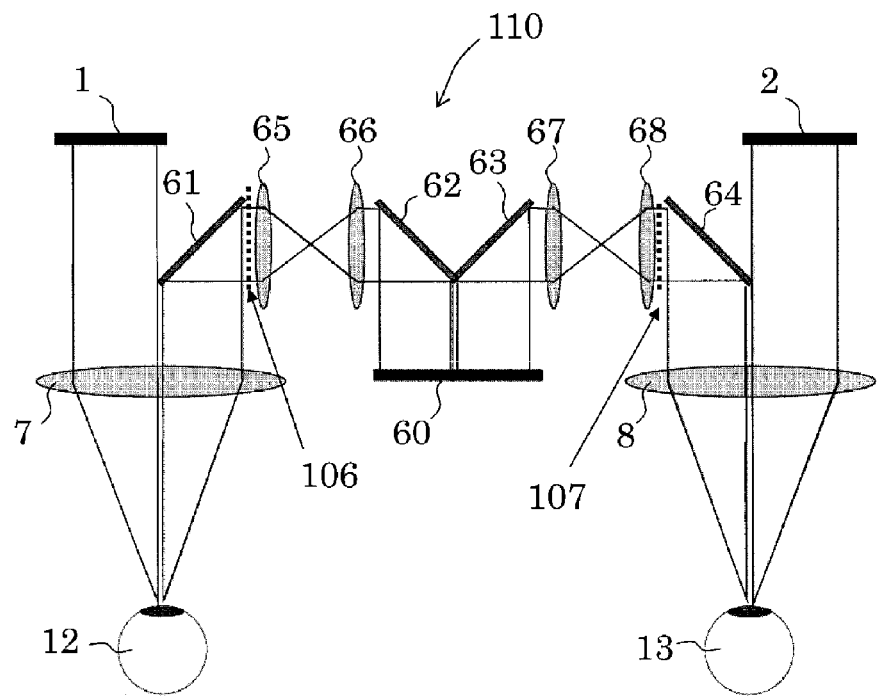
FIG. 11 shows a configuration of an HMD that is Embodiment 6 of the present invention.

FIG. 11 shows a configuration of an HMD as an image display apparatus which is a sixth embodiment (Embodiment 6) of the present invention. This embodiment uses three image-forming elements (first, second and third image-forming elements 1, 2 and 60). An original image forming area of the third image-forming element 60 disposed at a center among the three image-forming elements 1, 2 and 60 is divided left and right. Light fluxes from the divided original image forming areas form intermediate images and then are introduced to first and second exit pupils 12 and 13.

A light flux (first light flux) from a first original image formed by the first image-forming element 1 is introduced to the first exit pupil (left eye of an observer) 12 through a first ocular lens 7. The light flux forms a first split image in a left viewing angle area of an observation viewing angle from the first exit pupil 12.

A light flux (second light flux) from a second original image formed by the second image-forming element 2 is introduced to the second exit pupil (right eye of the observer) 13 through a second ocular lens 8. The light flux forms a second split image in a right viewing angle area of an observation viewing angle from the second exit pupil 13.

The third image-forming element 60 forms an original image (third original image) for the left eye in its left half original image forming area, and an original image (fourth original image) for the right eye in its right half original image forming area. A light flux (third light flux) from the third original image formed by the third image-forming element 60 is reflected by a reflection mirror 62 and then transmitted through relay lenses 66 and 65 to form an intermediate image 106 near the relay lens 65 (at a position between the relay lens 65 and a reflection mirror 61).

Further, the light flux is reflected by the reflection mirror 61 and then introduced to the first exit pupil 12 through the first ocular lens 7. The light flux introduced to the first exit pupil 12 forms a third split image in a right viewing angle area of the observation viewing angle from the first exit pupil 12.

Similarly, a light flux (fourth light flux) from the fourth original image formed by the third image-forming element 60 is reflected by a reflection mirror 63 and then transmitted through relay lenses 67 and 68 to form an intermediate image 107 near the relay lens 68 (at a position between the relay lens 68 and a reflection mirror 64). Further, the light flux is reflected by the reflection mirror 64 to be introduced to the second exit pupil 13 through the second ocular lens 8. The light flux introduced to the second exit pupil 13 forms a fourth split image in a left viewing angle area of the observation viewing angle from the second exit pupil 13.

The first and second ocular lenses 7 and 8 respectively correspond to first and second optical elements. The reflection mirrors 61 to 64 and the relay lenses 65 to 68 constitute a relay optical system 110. Further, the first and second ocular lenses 7 and 8 and the relay optical system 110 constitute an observation optical system.

This embodiment can display for the first exit pupil 12 a combined image formed by joining the first split image corresponding to the first original image formed on the first image-forming element 1 and the third split image corresponding to the third original image formed in the left original image forming area of the third image-forming element 60.

Also this embodiment can display for the second exit pupil 13 a combined image formed by joining the second split image corresponding to the second original image formed on the second image-forming element 2 and the fourth split image corresponding to the fourth original image formed in the right original image forming area of the third image-forming element 60. In other words, in an HMD for both eyes, a combined image with a wide viewing angle can be displayed by using three image-forming elements.

The third image-forming elements 60 can simultaneously form the original image for the left eye and the original image for the right eye. The relay optical system 110 causes the light fluxes from these original images to form the intermediate images to be reversed vertically and horizontally. However, if an original image reversed vertically and horizontally with respect to a normal direction is formed beforehand on the third image-forming element 60, the second and fourth split images are displayed with the normal direction. Accordingly, the image reversing optical systems described in Embodiments 1 and 3 to 5 and the time-division shutter described in Embodiment 2 are not needed.

Further, this embodiment can mutually different images for the left eye and the right eye. Providing a parallax to these images enables displaying of combined images having a parallax to the left and right eyes. Thus, a stereoscopic 3D image can be displayed.

In this case, the first image-forming element 1 forms a first original image corresponding to a parallax image displayed in the left viewing angle area for the left eye, and the third image-forming element 60 forms in its left original image forming area a third original image corresponding to a parallax image displayed in the right viewing angle area for the left eye. The second image-forming element 2 forms a second original image corresponding to a parallax image displayed in the right viewing angle area for the right eye, and the third image-forming element 60 forms in its right original image forming area a fourth original image corresponding to a parallax image displayed in the left viewing angle area for the right eye.

This embodiment does not need to form original images for the left and right eyes by the image forming-elements 1, 2 and 60 in a time-division manner, which is different from Embodiment 2, and therefore this embodiment can display a 3D image without generating flicker.

Further, this embodiment does not include in the observation optical system an optical system such as a half mirror having a beam splitting function. Therefore, this embodiment can display a bright image.

FIG. 11 shows the configuration using the first and second ocular lenses 7 and 8, the reflection mirrors 61 to 64 as reflection surfaces and the relay lenses 65 to 68. In place of these components, however, at least one prism-shaped optical element including one or plural reflection surfaces or one or plural surfaces having an optical power may be used.

Numerical Example 5

Figure 12:
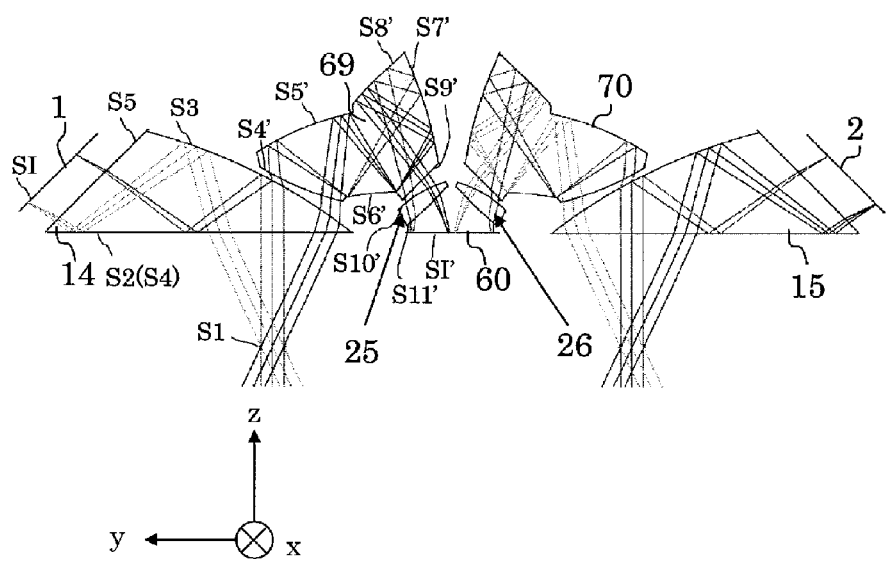
FIG. 12 is an optical sectional view showing a numerical example of Embodiment 6.

FIG. 12 shows an optical section of a numerical example (Numerical Example 5) of Embodiment 6. In this numerical example, in place of the first and second ocular lenses 7 and 8, the reflection mirrors 61 to 64 and the relay lenses 65 to 68 shown in FIG. 11, a prism-shaped optical element which folds optical paths by using plural reflection surfaces (including an decentered reflective curved surface) is used.

Reference numerals 14 and 15 denote first and second ocular prisms, each of which is formed of a transparent member having three surfaces. Reference characters S2 and S4 denote a same surface.

Reference numerals 69 and 70 denote first and second relay prisms, each of which is formed of a transparent member (optical element) having six surfaces. Reference characters S4' and S6' denote a same surface.

Reference numerals 25 and 26 denote first and second optical elements.

Reference characters SI and SI' denote image-forming surfaces (image display surfaces) of the first and third image-forming elements 1 and 60. Reference character S1 denotes a first exit pupil.

In this numerical example, a surface S8' is a non-rotationally symmetric surface having a surface-symmetric shape in which a paper surface (y-z cross section) of FIG. 12 is a unique plane of symmetry. Table 5 shows optical data of Numerical Example 5.

TABLE 5

| SURF | X | Y | Z | A | R | TYP | Nd | vd |
|---|---|---|---|---|---|---|---|---|
| 1 | 0.000 | 0.000 | 0.000 | 0.000 | | | | |
| 2 | 0.000 | −15.000 | 20.000 | 0.000 | ∞ | SPH | 1.5709 | 33.8 |
| 3 | 0.000 | 0.000 | 29.000 | −28.000 | −100.0000 | SPH | −1.5709 | 33.8 |
| 4 | 0.000 | 10.000 | 20.000 | 0.000 | ∞ | SPH | 1.5709 | 33.8 |
| 5 | 0.000 | 10.000 | 50.000 | 45.000 | ∞ | SPH | 1.0000 | 0.0 |
| I | 0.000 | 46.000 | 22.000 | 45.000 | | | | |
| 3 | 0.000 | 0.000 | 29.000 | −28.000 | −100.0000 | SPH | 1.0000 | 0.0 |
| 4' | 0.000 | −0.469 | 29.883 | −28.000 | 50.0000 | SPH | 1.4000 | 30.0 |
| 5' | 0.000 | −0.168 | 35.706 | 29.000 | −50.0000 | SPH | −1.4000 | 30.0 |
| 6' | 0.000 | −6.471 | 24.336 | 19.000 | −50.0000 | SPH | 1.4000 | 30.0 |
| 7' | 0.000 | −29.163 | 32.150 | −81.000 | −70.0000 | SPH | −1.4000 | 30.0 |
| 8' | 0.000 | −23.071 | 51.434 | −135.000 | 70.0000 | FFS1 | 1.4000 | 30.0 |
| 9' | 0.000 | −35.799 | 38.706 | −135.000 | ∞ | SPH | 1.0000 | 0.0 |
| 10' | 0.000 | −24.485 | 25.978 | −145.000 | 20.0000 | SPH | 1.6001 | 20.0 |
| 11' | 0.000 | −26.206 | 23.521 | −138.000 | −50.0000 | SPH | 1.0000 | 0.0 |
| I' | 0.000 | −31.500 | 20.000 | 0.000 | | | | |

| FFS1 | c1: 2.2240e+001 | c5: 1.1650e−002 | c6: −5.7922e−003 | c10: −6.6927−004 |
| | c11: 9.1175e−005 | c12: −5.6870e−007 | c13: 5.9219e−006 | c14: −9.1993e−006 |

Numerical Example 5 of Table 5 shows an observation optical system which has an exit pupil diameter of Φ4 mm and an image display size (original image size) of about 16 mm×12 mm in each of the three image-forming elements, and which displays a combined image with a horizontal viewing angle of 50° and a vertical viewing angle of 38.5° at an infinite distance in a positive direction of a z axis (visual axis).

In Numerical Example 5, the horizontal viewing angle is divided into two viewing angle areas, and image-forming elements (first and third image-forming elements 1 and 60) are provided for one of the two viewing angle areas and image-forming elements (second and third image-forming elements 2 and 60) are provided for the other one of the two viewing angle areas. In other words, each of the first image-forming element 1 and the left original image forming area of the third image-forming element 60 forms an original image corresponding to a horizontal viewing angle of 25°, and each of the second image-forming element 2 and the right original image forming area of the third image-forming element 60 forms an original image corresponding to a horizontal viewing angle of 25°. The vertical viewing angle is not divided, and hence each of the first to third image-forming elements 1, 2 and 60 forms an original image corresponding to a vertical viewing angle of 38.5°.

A distance between the left and right exit pupils is set to 63 mm, and the observation optical system is configured to be left and right symmetric. Specifically, the first and second ocular prisms 14 and 15, the first and second relay prisms 69 and 70 and the first and second optical elements 25 and 26 are respectively formed to have a left and right symmetric shape, and disposed left and right symmetrically.

Reflections by the surfaces S4 and S6' are internal total reflections in the first ocular prism 14 and the first relay prism 69. Reflections by the surfaces S3, S5', S7' and S8' are mirror reflections by reflective films.

As can be understood from FIG. 12, in this numerical example, the surface S3 does not include an overlapped area between the area transmitting light rays and the area reflecting light rays. Therefore, a reflective film is formed only in the reflecting area reflecting a light ray from the first image-forming element 1 in the surface S3, while no reflective film is formed in other areas. As a result, loss of light amount due to transmission and reflection at the surface S3 can be reduced.

The first and second optical elements 25 and 26 have a function of reducing an exit angle of light rays exiting from the third image-forming element 60. Reducing the exit angle thereof enables displaying of an image whose color unevenness caused by viewing angle characteristics is reduced.

Further, this embodiment divides the observation viewing angle from one exit pupil into two viewing angle areas having equal angles in the horizontal direction. However, changing a dividing ratio of the viewing angle areas according to characteristics of the observation optical system or resolution of the image-forming element to be used enables displaying of an easily observable image for the observer.

Moreover, the use of the same image-forming element as the first to third image-forming elements 1, 2 and 60 enables a further cost reduction and provision of a more comfortable observation environment to the observer as compared with a case where plural types of image-forming elements are used. Further, even when original images formed by the first to third image-forming elements 1, 2 and 60 are distorted, an image with little distortion can be displayed by providing distortion aberration reverse to the distortion of the original images to the observation optical system.

Embodiment 7

Figure 13:
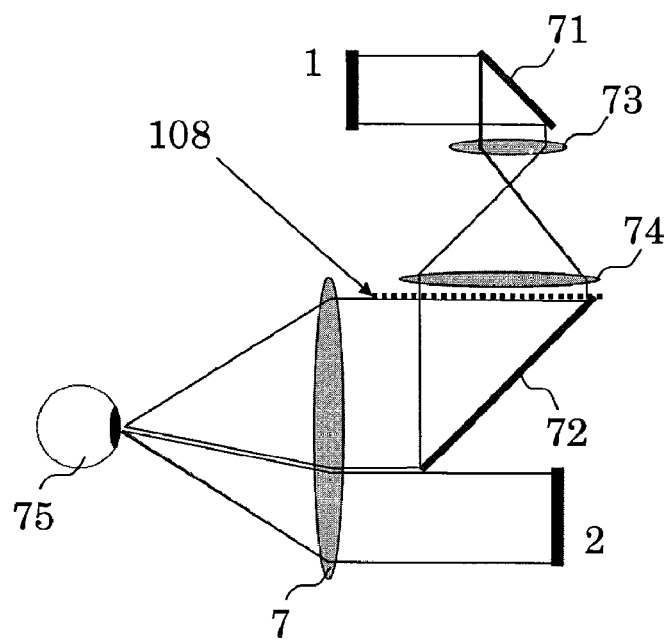
FIG. 13 shows a configuration of an HMD that is Embodiment 7 of the present invention.

FIG. 13 shows a configuration of an HMD as an image display apparatus which is a seventh embodiment (Embodiment 7) of the present invention. This embodiment uses, for one eye (one exit pupil), two image-forming elements (first and second image-forming elements) 1 and 2 having image display sizes (original image sizes) equal to each other. In this embodiment, a viewing angle area for an image displayed through an optical system which causes a light flux from the first image-forming element 1 to form an intermediate image is wider than a viewing angle area for an image displayed through an optical system which introduces a light flux from the second image-forming element 2 to the exit pupil only through an ocular lens 7.

Referring to FIG. 13, a case where an observation viewing angle is divided in a vertical direction will be described. However, the configuration of this embodiment can be applied to a case where an observation viewing angle is divided in a horizontal direction.

In FIG. 13, a light flux (first light flux) from a first original image formed by the first image-forming element 1 is reflected by a reflection mirror 71 and then transmitted through relay lenses 73 and 74 to form an intermediate image 108 near the relay lens 74 (at a position between the relay lens 74 and a reflection mirror 72). The light flux is reflected by the reflection mirror 72 to be introduced to the ocular lens (optical element) 7, and then introduced to an exit pupil (one eye of an observer) 75 via the ocular lens 7.

In this case, the light flux forms a first split image in an upper half viewing angle area (first viewing angle area) of an observation viewing angle from the exit pupil 75.

A light flux (second light flux) from a second original image formed by the second image-forming element 2 is introduced to the exit pupil 75 through the ocular lens 7. The light flux forms a second split image in a lower half viewing angle area (second viewing angle area) of the observation viewing angle from the exit pupil 75.

The reflection mirrors 71 and 72, the relay lenses 73 and 74 and the ocular lens 7 constitute a first optical system and an observation optical system.

Thus, a combined image formed by joining the two split images corresponding to the two original images formed by the two image-forming elements 1 and 2 can be displayed for one exit pupil 75. In other words, the use of the two image-forming elements 1 and 2 enables displaying of a combined image with a wide viewing angle.

Although the first viewing angle area is wider than the second viewing angle area as described above, sizes of the first and second image-forming elements 1 and 2 can be set approximately equal to each other. This is because the optical system which causes the light flux from the first image-forming element 1 to form the intermediate image can optionally set its magnification, which makes it possible for the optical system to have a higher magnification than that of the optical system which introduces the light flux from the second image-forming element 2 to the exit pupil only through the ocular lens 7.

In order to realize an observation optical system having a wide viewing angle approximately equal to that of this embodiment, an optical system that forms no intermediate image needs three image-forming elements. As in the case of this embodiment, however, the number of image-forming elements can be reduced to two by causing the light flux from one of the image-forming elements to form an intermediate image. Accordingly, this embodiment can realize an observation optical system having an extremely wide viewing angle with plural compact image-forming elements whose number is as small as possible.

Setting the lower viewing angle area narrower than the upper viewing angle area enables compact formation of an optical system disposed lower than the exit pupil 75. Thus, interferences of the optical system with a nose of the observer can be prevented.

Embodiment 8

Figure 14:
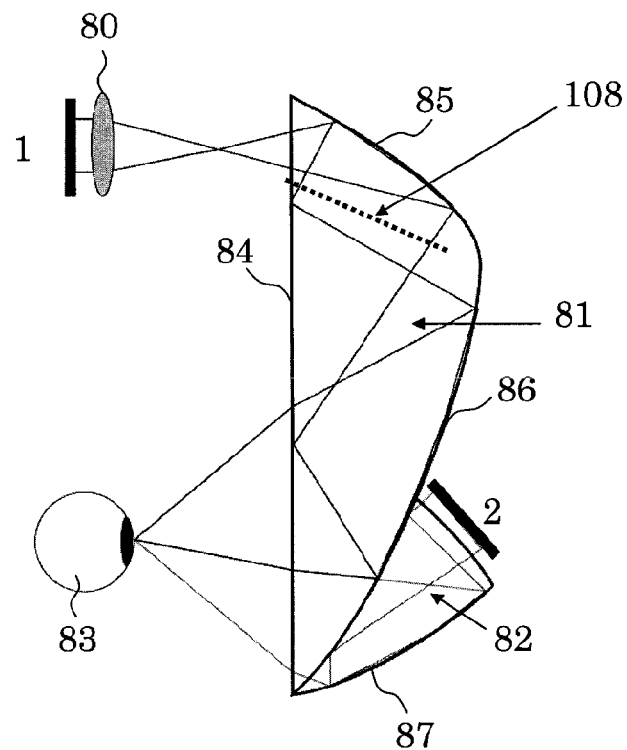
FIG. 14 shows a configuration of an HMD that is Embodiment 8 of the present invention.

FIG. 14 shows a configuration of an HMD as an image display apparatus which is an eighth embodiment (Embodiment 8) of the present invention. This embodiment uses, in place of the reflection mirror, the relay lens and the ocular lens in Embodiment 7, prisms (optical elements) 81 and 82 each of which folds an optical path by using plural decentered reflective curved surfaces. The prism 81 constitutes a first optical system, and the prisms 81 and 82 constitute an observation optical system.

The prisms 81 and 82 are formed of transparent members filled thereinside with an optical medium such as glass or plastic having a refractive index larger than 1, and coupled together on a surface 86. Referring to FIG. 14, a case where an observation viewing angle is divided in a vertical direction will be described. However, the configuration of this embodiment can be applied to a case where the observation viewing angle is divided in a horizontal direction.

In FIG. 14, a light flux (first light flux) from a first original image formed by a first image-forming element 1 is transmitted through the lens 80, and then enters the prism 81 trough a surface 84 thereof. The light flux is reflected on a surface 85 of the prism 81, sequentially reflected by the surfaces 84 and 86 while forming an intermediate image 108, transmitted through the surface 84 to exit from the prism 81, and then introduced to an exit pupil (one eye of an observer) 83. The light flux introduced to the exit pupil 83 forms a first split image in an upper half viewing angle area (first viewing angle area) of an observation viewing angle from the exit pupil 83.

A light flux (second light flux) from a second original image formed by a second image-forming element 2 enters the prism 82 to be sequentially reflected by the surfaces 86 and 87, and then is transmitted through the surface 86 to enter the prism 81. Then, the light flux is transmitted through the surface 84 to exit from the prism 81, and then introduced to the exit pupil 83. The light flux introduced to the exit pupil 83 forms a second split image in a lower half viewing angle area (second viewing angle area) of the observation viewing angle from the exit pupil 83.

Thus, a combined image formed by joining the two split images corresponding to the two original images formed by the two image-forming elements 1 and 2 can be displayed for one exit pupil 83. In other words, the use of the two image-forming elements 1 and 2 enables displaying of a combined image with a wide viewing angle.

Setting reflections by the surfaces 86 and 87 in the prism 82 to mirror reflections by reflective films enables a reduction in loss of light amount.

Further, setting reflections by the surfaces 85 and 86 in the prism 81 to mirror reflections by reflective film and setting a reflection by the surface 84 to internal total reflection enable a reduction in loss of light amount.

Instead of coupling the prisms 81 and 82 together on the surface 86, an air layer may be disposed therebetween. In this case, the prism 81 may employ the same configuration as that when it is coupled with the prism 82. However, the prism 82 is preferably configured such that the light flux exits from the prism 82 via two reflections including an internal total reflection and a mirror reflection. This can eliminate one mirror reflection, and thereby further reducing the loss of light amount.

Further, in this embodiment, a magnification of an optical system which causes the light flux from the first image-forming element 1 to form an intermediate image can be set high. Thus, as compared with a case where the light flux from the second image-forming element 2 is reflected once by the prism 82 to be transmitted through the prism 81 and then introduced to the exit pupil 83, a viewing angle area formed by the high magnification optical system in the entire observation viewing angle is wider. Reducing the viewing angle area formed by the optical system introducing the light flux from the second image-forming element 2 to the exit pupil 83 enables compact formation of an optical system located lower than the exit pupil 83. As a result, interferences of the lower optical system with a nose of the observer can be prevented.

Forming all surfaces of the prisms 81 and 82 as curved surfaces which contribute to light collection, light divergence or aberration correction can decrease unnecessary surfaces in the optical system to achieve a cost reduction.

More preferably, forming all surfaces constituting the prisms 81 and 82 as non-rotationally symmetric surfaces increases a degree of freedom for correcting decentration aberration, which makes it possible to display a good quality image. In this case, it is preferable to cause each non-rotationally symmetric surface to have a surface-symmetric shape in a direction of the local sagittal cross section where the local meridional cross section is a unique plane of symmetry. This makes it easier to produce the prism as compared with a case where the surface has no symmetry.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2008-281776, filed on Oct. 31, 2008, which is hereby incorporated by reference herein in its entirety.

What is claimed is:

1. An image display apparatus comprising:
    a first image-forming element configured to form a first original image;
    a second image-forming element configured to form a second original image; and
    an observation optical system configured to include (a) a first optical element introducing a first light flux of a light flux from the first image-forming element to a first exit pupil, (b) a second optical element introducing a second light flux of a light flux from the second image-forming element to a second exit pupil, and (c) a relay optical system causing a third light flux of the light flux from the second image-forming element to form an intermediate image and introducing the third light flux to the first optical element, and causing a fourth light flux of the light flux from the first image-forming element to form an intermediate image and introducing the fourth light flux to the second optical element, the first light flux and the second light flux not entering the relay optical system,
    wherein the observation optical system displays images corresponding to the first and second original images in mutually different viewing angle areas of an observation viewing angle from the first exit pupil by introducing the first and third light fluxes to the first exit pupil through the first optical element, and displays images corresponding to the second and first original images in mutually different viewing angle areas of an observation viewing angle from the second exit pupil by introducing the second and fourth light fluxes to the second exit pupil through the second optical element.

2. The image display apparatus according to claim 1, further comprising:
    a first light splitter configured to split the light flux from the first image-forming element into the first light flux and the fourth light flux; and
    a second light splitter configured to split the light flux from the second image-forming element into the second light flux and the third light flux.

3. The image display apparatus according to claim 1,
    wherein the relay optical system causes each of the third and fourth light fluxes to form an intermediate image an odd number of times and respectively introduces the third and fourth light fluxes to the first and second optical elements, and wherein the relay optical system includes an image reversing member having an image reversing function for the third and fourth light fluxes.

4. The image display apparatus according to claim 1, further comprising:
a switching member configured to alternately switch between a state where the first and third light fluxes are introduced to the first exit pupil and a state where the second and fourth light fluxes are introduced to the second exit pupil.

5. The image display apparatus according to claim 1,
wherein the relay optical system causes each of the third and fourth light fluxes to form intermediate images an even number of times and respectively introduces the third and fourth light fluxes to the first and second optical elements.

* * * * *